United States Patent [19]
Zinguuzi

[11] Patent Number: 5,890,007
[45] Date of Patent: Mar. 30, 1999

[54] MULTI-CLUSTER PARALLEL PROCESSING COMPUTER SYSTEM

[75] Inventor: Satoshi Zinguuzi, Yamanashi, Japan

[73] Assignee: NEC Corporation, Tokyo, Japan

[21] Appl. No.: 607,013

[22] Filed: Feb. 26, 1996

[30] Foreign Application Priority Data

Feb. 28, 1995 [JP] Japan .................................. 7-039547

[51] Int. Cl.⁶ ...................................................... G06F 3/60
[52] U.S. Cl. ................... 395/800.06; 364/229; 364/243; 364/DIG. 1; 395/800.29; 711/147; 711/150
[58] Field of Search .................................... 395/406, 800, 395/412; 711/202

[56] References Cited

U.S. PATENT DOCUMENTS

| | | | |
|---|---|---|---|
| 4,933,936 | 6/1990 | Rasmussen et al. ..................... | 370/406 |
| 5,010,477 | 4/1991 | Omoda et al. ........................... | 395/800 |
| 5,392,446 | 2/1995 | Tower et al. ............................. | 395/800 |
| 5,428,803 | 6/1995 | Chen et al. .............................. | 395/800 |
| 5,590,301 | 12/1996 | Guenthner .............................. | 395/412 |

OTHER PUBLICATIONS

IEEE 1696 92–IEEE Standard for Scalable Coherent Interface 1992, pp. 23,24, & 71.
K. Hwang, "Advanced Computer Architecture"; 1993, McGraw–Hill Inc., pp. 331–336.

*Primary Examiner*—Tod R. Swann
*Assistant Examiner*—Fred F. Tzeng
*Attorney, Agent, or Firm*—Whitham, Curtis & Whitham

[57] ABSTRACT

A multi-cluster computer system includes a plurality of clusters and a crossbar network for connecting the clusters. Each cluster includes processors, a shared memory, local network, data holding memory, shared memory access mechanism, data transfer mechanism. The data holding memory stores data to be broadcasted. The shared memory access mechanism transfers broadcast data from the shared memory to the data holding memory when one of the processors requests a broadcast. The data transfer mechanism transfers the broadcast data from the data holding mechanism to a plurality of destination clusters one after another. Each cluster may include parameter holding memory. The parameter holding memory stores parameters for each of the destination clusters. Each parameter includes information indicative of a corresponding destination cluster and an address at which the broadcast data is stored. The data transfer mechanism transfers the broadcast data to a destination cluster along with corresponding one of the parameters.

10 Claims, 22 Drawing Sheets

MULTI-CLUSTER PARALLEL PROCESSING COMPUTER SYSTEM

BACKGROUND OF THE INVENTION

The present invention relates to an information processing system including a plurality of clusters, and more particularly to an information processing system including means for controlling data transfers between clusters.

DESCRIPTION OF THE PRIOR ART

An example of the prior art relating to an information processing system including a plurality of clusters is disclosed in Kai Hwang, Advanced Computer Architecture, 1993, McGraw-Hill Inc., New York, p. 336, FIG. 7.4 (Prior Art 1). In this instance of the prior art, each cluster comprises a plurality of processors P, one main memory MM and cluster buses for connecting these elements. Each information processing system comprises a plurality of clusters. The cluster buses of the clusters are connected by a global bus.

A data transfer from one cluster to the rest of the plurality of clusters is accomplished in the following steps. In this example, the information processing system has clusters #0 through #(N−1). The cluster #0 has a main memory MM#0 and processors #0-0 through #0-n. In response to a request from the processor #0-0, data D in the main memory MM#0 are transferred to the clusters #1 through #(N−1).

At the first step, the processor #0-0 reads data D out of the main memory MM#0. The time taken by the first step is Ta.

At the second step, the processor #0-0 transmits the data D to the cluster #1 via a cluster bus and the global bus. The processor #0-0 waits for a notification of the completion of reception to come from the cluster #1. The time taken by the second step is Tb.

Referring to FIG. 1, the data D are transferred to the clusters #2 through #(N−1) by repeating the first and second steps. The total time T taken to transfer the data is equal to (Ta+Tb)×(N−1).

Besides the foregoing example of the prior art, the following instance of the prior art is also known.

In IEEE 1696 92-IEEE Standard for Scalable Coherent Interface, Aug. 2, 1992, pp. 23, 24 and 71 is disclosed a broadcast technique for use in an information processing system having a ringlet type transmission path (Prior Art 2). According to this technique, too, the time taken to transfer data to N−1 clusters is (Ta+Tb)×(N−1).

In the Gazette of the Japanese Patent Laid-open No. 1992-287153 is described a technique according to which a broadcast type communication bus is provided separately from an inter-cluster network (Prior Art 3).

The foregoing examples of the prior art involve the following problems.

Prior Art 1 takes a long time to transfer data because the data to be transferred are read out of the main memories repeatedly.

Prior Art 2 is slow in transfer rate because other clusters intervene on the path of data transfers to each destination cluster.

Prior Art 3 involves a greater hardware volume because a broadcast type communication bus is provided separately.

Furthermore, in any system in which processors directly receive data, there is the problem that processing by the processors is interrupted every time data are transferred.

SUMMARY OF THE INVENTION

In view of these problems, one of the objects of the present invention is to broadcast data to a plurality of clusters in a short period of time.

Another object of the invention is to reduce the number of times data are read out of main memories in connection with broadcasting.

Still another object of the invention is to transfer data simultaneously to a plurality of clusters.

Yet another object of the invention is to transfer data to any destination cluster with no other intervening cluster.

A further object of the invention is to achieve the aforementioned objects without entailing an increase in hardware volume.

According to the present invention, a multi-cluster computer system includes a plurality of clusters and inter-cluster connection means for connecting the plurality of clusters. Each of the plurality of clusters comprises processors, a shared memory, intra-cluster connection means, data holding means, shared memory access means, data transfer means. The intra-cluster connection means connects the plurality of processors and the shared memory. The data holding means stores data to be broadcasted. The shared memory access means transfers broadcast data from the shared memory to the data holding means when one of the plurality of processors requests a broadcast. The data transfer means transfers the broadcast data from the data holding means to a plurality of destination clusters one after another.

Each cluster may comprise data storage means. The data storage means receives the broadcast data from the inter-cluster connection means and stores the broadcast data in the shared memory.

Each cluster may comprise parameter holding means. The parameter holding means stores parameters for each of the destination clusters. Each parameter includes information indicative of a corresponding destination cluster and an address at which the broadcast data is stored. The data transfer means may transfer the broadcast data to a destination cluster along with a corresponding one of the parameters.

The data transfer means may divide the broadcast data into a plurality of data blocks and transfers the data blocks to the destination clusters. Each of the plurality of clusters comprises parameter generating means. The parameter generating means generates parameters for the data blocks by repeatedly adding the length of the data blocks to the address in the parameters stored in the parameter holding means.

Each cluster may post reception of the broadcast data when the broadcast data is received therein. Each cluster may comprise broadcast end monitoring means for determining whether all of the designation clusters post reception of the broaecast data.

According to another configuration of the present invention, the data holding means and the data transfer means are provided in the inter-cluster connection means. The inter-cluster connection means may comprise arbitration means for arbitrating data transfer via the inter-cluster connection means.

DESCRIPTION OF THE PREFERRED EMBODIMENTS

Next will be described a first preferred embodiment of the present invention with reference to drawings.

Figure 1:
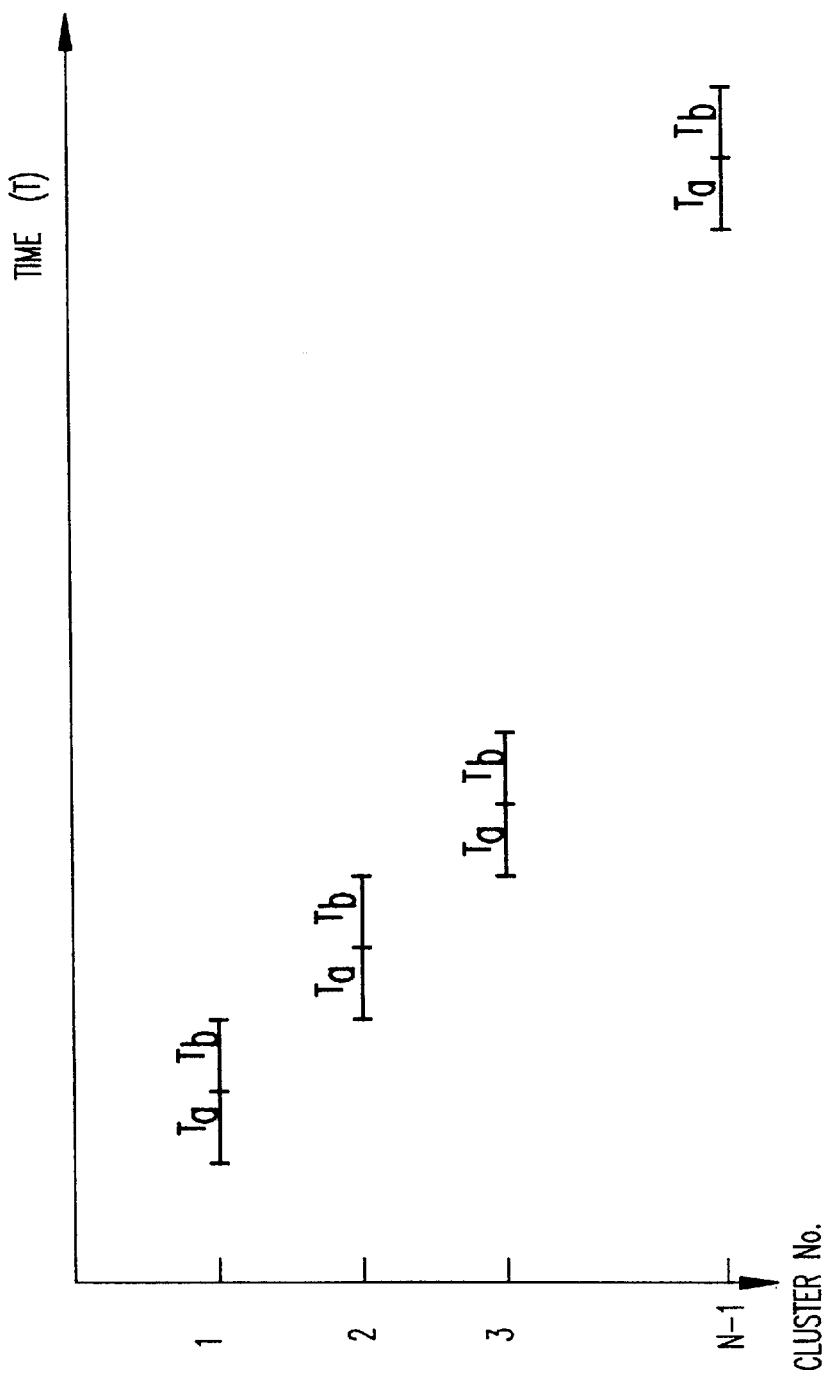
FIG. 1 is a diagram for explaining the time taken by a broadcast transfer according to the prior art.
Figure 2:
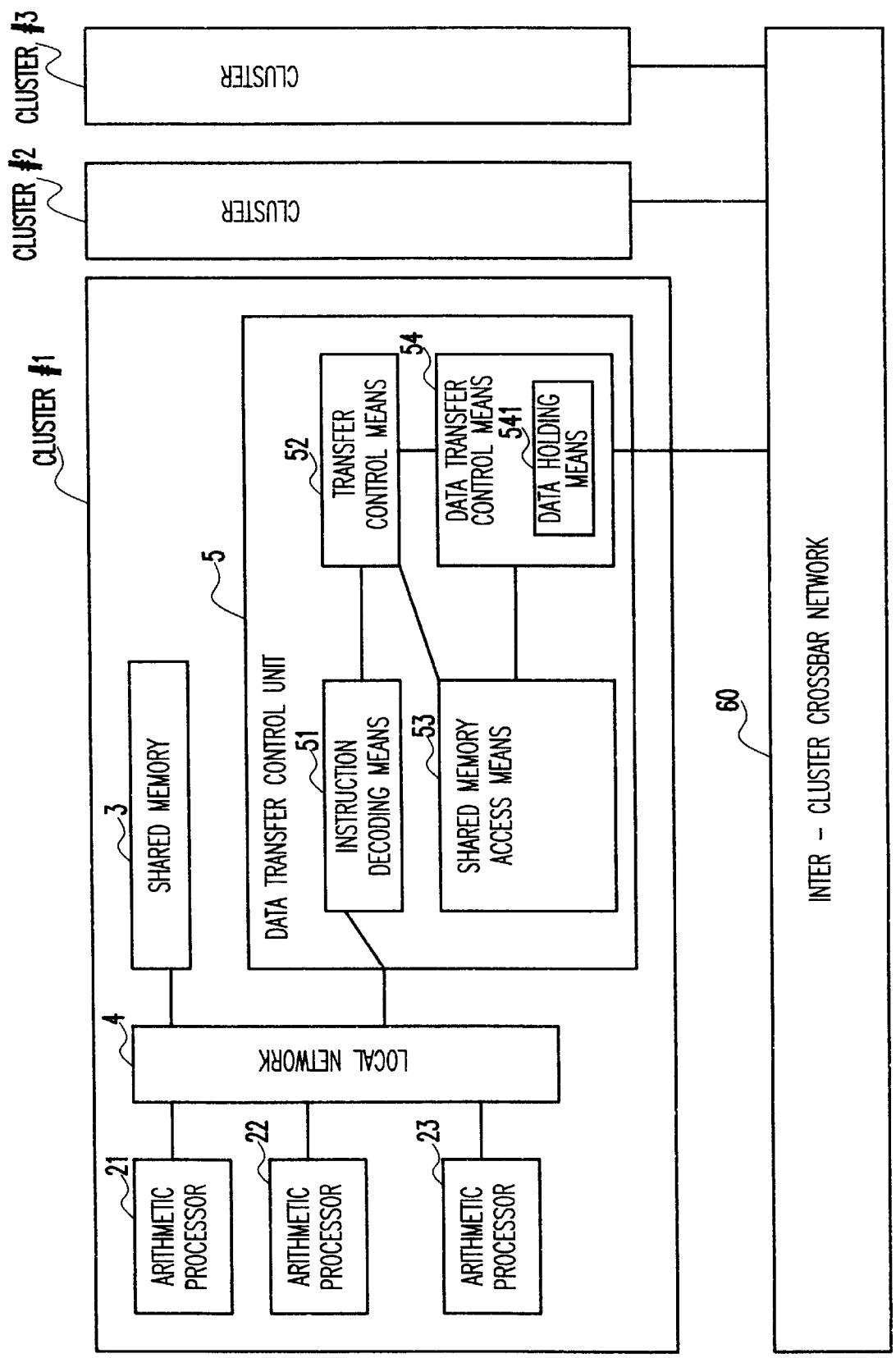
FIG. 2 is a block diagram illustrating the structure of a first preferred embodiment of the present invention.

Referring to FIG. 2, this embodiment, which is an information processing system, comprises clusters #1 through #3 and an inter-cluster crossbar network 60 for connecting these clusters. The cluster #1 comprises N arithmetic processors 21 through 2N, a shared memory 3 shared by all these arithmetic processors 21 through 2N, and a data transfer control unit 5 for controlling data transfers between the clusters. The arithmetic processors 21 through 2N, the shared memory 3 and the data transfer control unit 5 are connected by a local network 4.

Referring further to FIG. 2, the data transfer control unit comprises instruction decoding means 51, transfer control means 52, shared memory access means 53 and data transfer control means 54. The shared memory access means 53 executes reading out of and writing into the shared memory 3 via the local network 4. The instruction decoding means 51 decodes instructions issued by the arithmetic processors 21 through 2N. If any such instruction is a broadcast instruction, the instruction decoding means 51 instructs the transfer control means 52 to execute a broadcast transfer. The data transfer control means 54 executes data transfers to other clusters. The data transfer control means 54 comprises data holding means 541, which temporarily holds data read out of the shared memory 3. Since the data holding means 541 temporarily holds data, the data need not be read out of the shared memory 3 more than once.

The transfer control means 52 controls the instruction decoding means 51, the shared memory access control means 53 and the data transfer control means 54.

Figure 3:
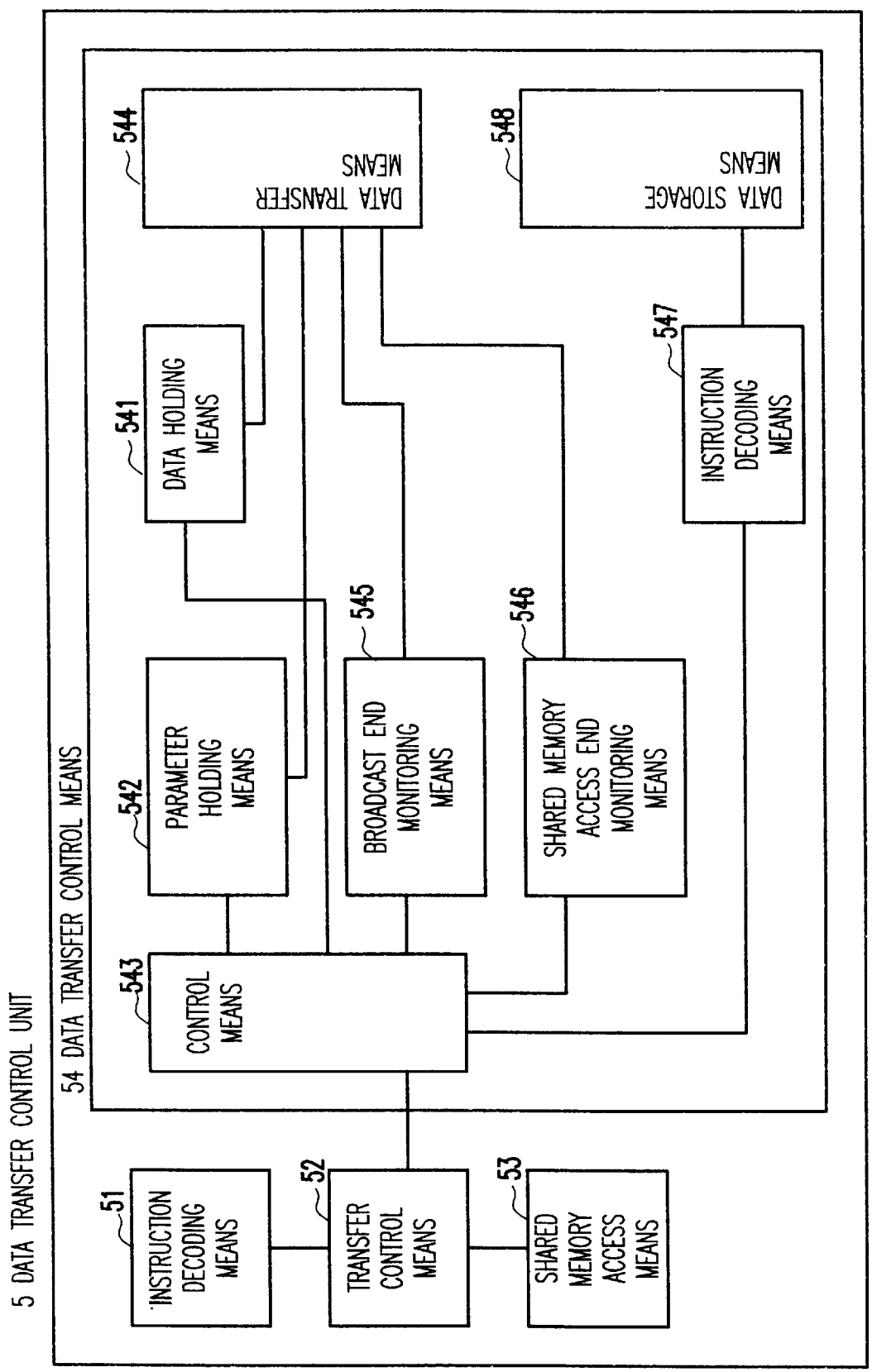
FIG. 3 is a block diagram illustrating the detailed structure of data transfer means 54.

Referring now to FIG. 3, the data transfer control means 54 comprises the data holding means 541, parameter holding means 542, control means 543, data transfer means 544, broadcast end monitoring means 545, shared memory access end monitoring means 546, instruction decoding means 547 and data storage means 548. The shared memory access end monitoring means 546 detects whether or not an access to the shared memory 3 has ended. The parameter holding means 542 stores the parameters to be needed for broadcasting. The data transfer means 544 transfers information stored in the data holding means 541 and the parameter holding means 542 to other clusters via the crossbar network 60. The data storage means 548 stores information taken in from the crossbar network 60. The instruction decoding means 547 determines whether or not information stored in the data storage means 548 indicates a broadcast instruction. The broadcast end monitoring means 545 determines whether or not all the destination clusters have sent signals indicating that the clusters have received the broadcast data.

Figures 4, 5:
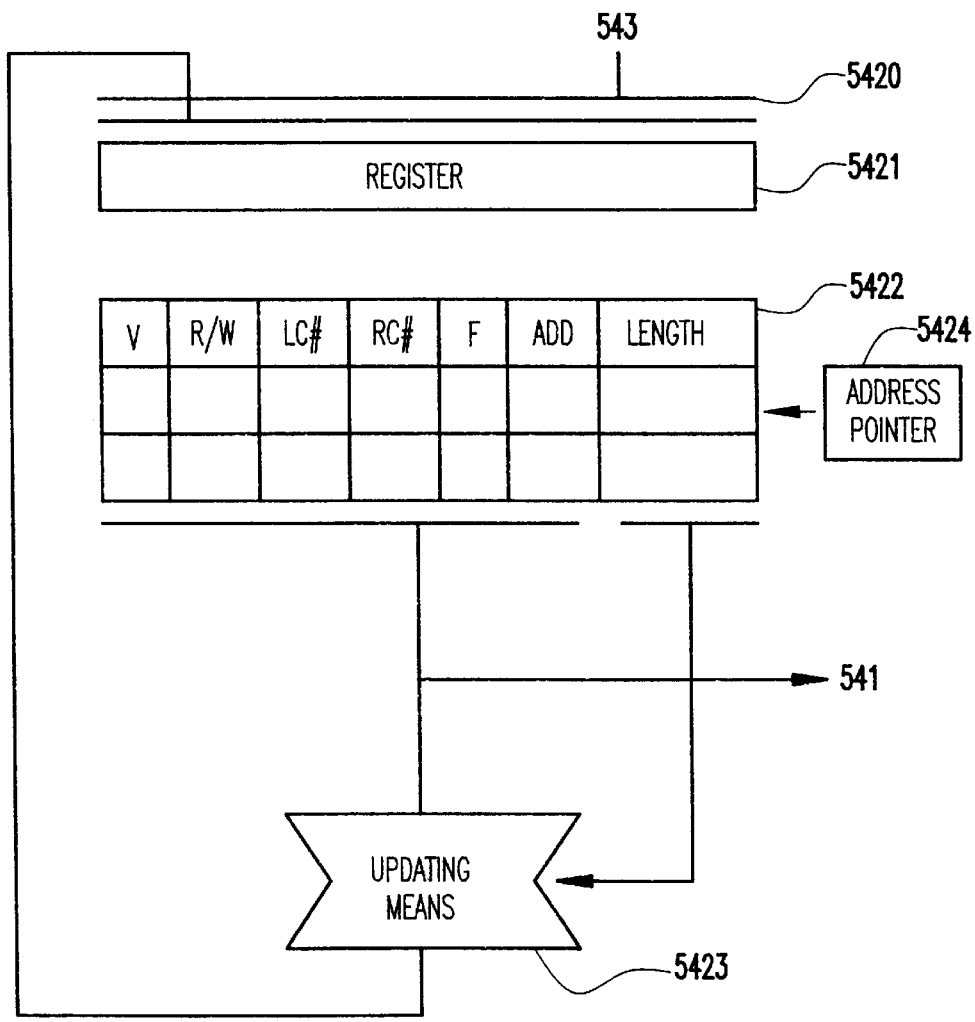
FIG. 4 is a diagram illustrating the parameter format for use in the first embodiment of the invention.
FIG. 5 is a block diagram illustrating the detailed structure of parameter holding means 542.

Referring to FIG. 4, the parameters comprise seven fields: V, R/W, LC#, RC$, F, ADD and LENGTH. The V field is a significant bit. The R/W field stores information indicating the read/write designation of the destination cluster. The LC# field stores the transfer origin cluster number. The RC# field stores the destination cluster number. The F field stores information indicating that the corresponding data are the final data. The ADD field stores the virtual address of the destination cluster. Transfer data are stored from the address represented by the ADD field. The LENGTH field stores the length of the data transferred and the length of data that can be transferred at a time.

Referring now to FIG. 5, the parameter holding means 542 comprises a selector 5420, a register 5421, a parameter buffer 5422, updating means 5423 and an address pointer 5424. The selector 5420 selects either a parameter received from the control means 543 or a parameter outputted by the updating means 5423, and the selected parameter is stored into the register 5421. The parameter stored into the register 5421 is further stored into the parameter buffer 5422, which stores a plurality of parameters. Out of the parameters stored in the parameter buffer 5422, what is designated by the address pointer 5424 is outputted from the parameter buffer 5422. The parameter outputted from the parameter buffer 5422 is supplied to the data holding means 541 and the updating means 5423, A parameter is generated for each destination cluster.

The updating means 5423 updates the contents of parameters. Updated parameters are stored again into the parameter buffer 5422 via the selector 5420 and the register 5421. The updating means 5423, when transferred data are divided into a plurality of data blocks, generates parameters for each data block. When a long set of data is to be transferred, it is divided into a plurality of data blocks each having a prescribed data length. This prescribed data length is stored in the LENGTH field of a parameter. The data blocks are sent out one at a time to the crossbar network 60. The updating means 5423 generates a parameter corresponding to the next data block by adding this prescribed data length to the ADD field of a parameter. In the F field of the parameter corresponding to the final data block is set "1".

Figure 6:
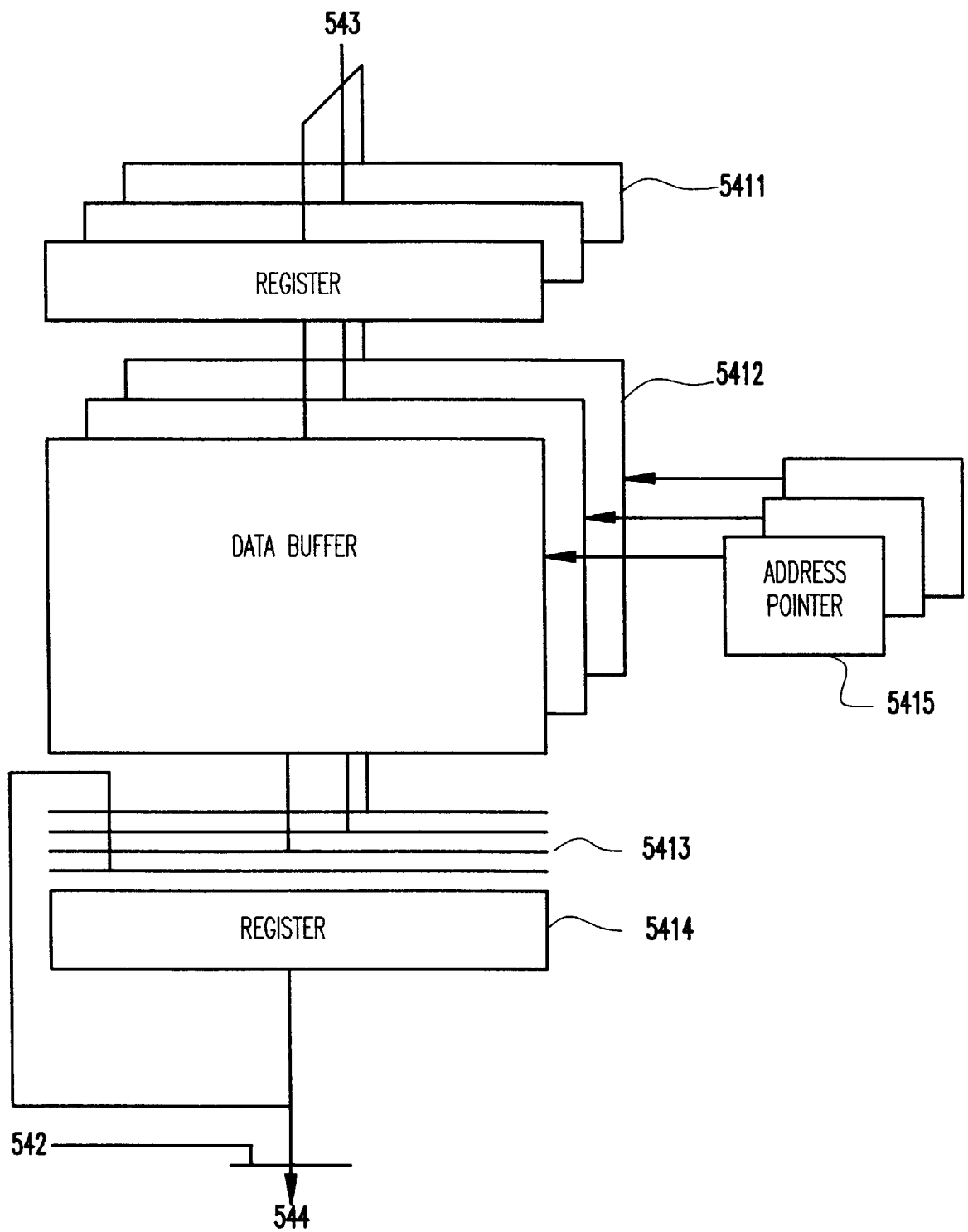
FIG. 6 is a block diagram illustrating the detailed structure of data holding means 541.

Referring to FIG. 6, the data holding means 541 comprises a register 5411, a data buffer 5412, a selector 5413, a register 5414 and an address pointer 5415. The data holding means 541 may include a plurality of data buffers 5412. By having a plurality of data buffers 5412 ready, it is made possible to store data into the data holding means 541 and to read out data from the data holding means 541 at the same time. In this particular embodiment, the data holding means 541 has three data buffers 5412.

The data received from the control means 543 are stored into the data buffer 5412. Of the data in the data buffer 5412, those designated by the address pointer 5415 are stored into the register 5414. The data stored into the register 5414 are outputted to the data transfer means 544. The parameters in the parameter holding means 542 are outputted to the data transfer means 544.

Next will be described the operation of this preferred embodiment with reference to drawings. Of the actions described below, steps 1 through 10 and 19 through 24 are executed by the cluster #1, step 11 by the crossbar network 60, and steps 12 through 18 by the cluster #2.

Figure 7:
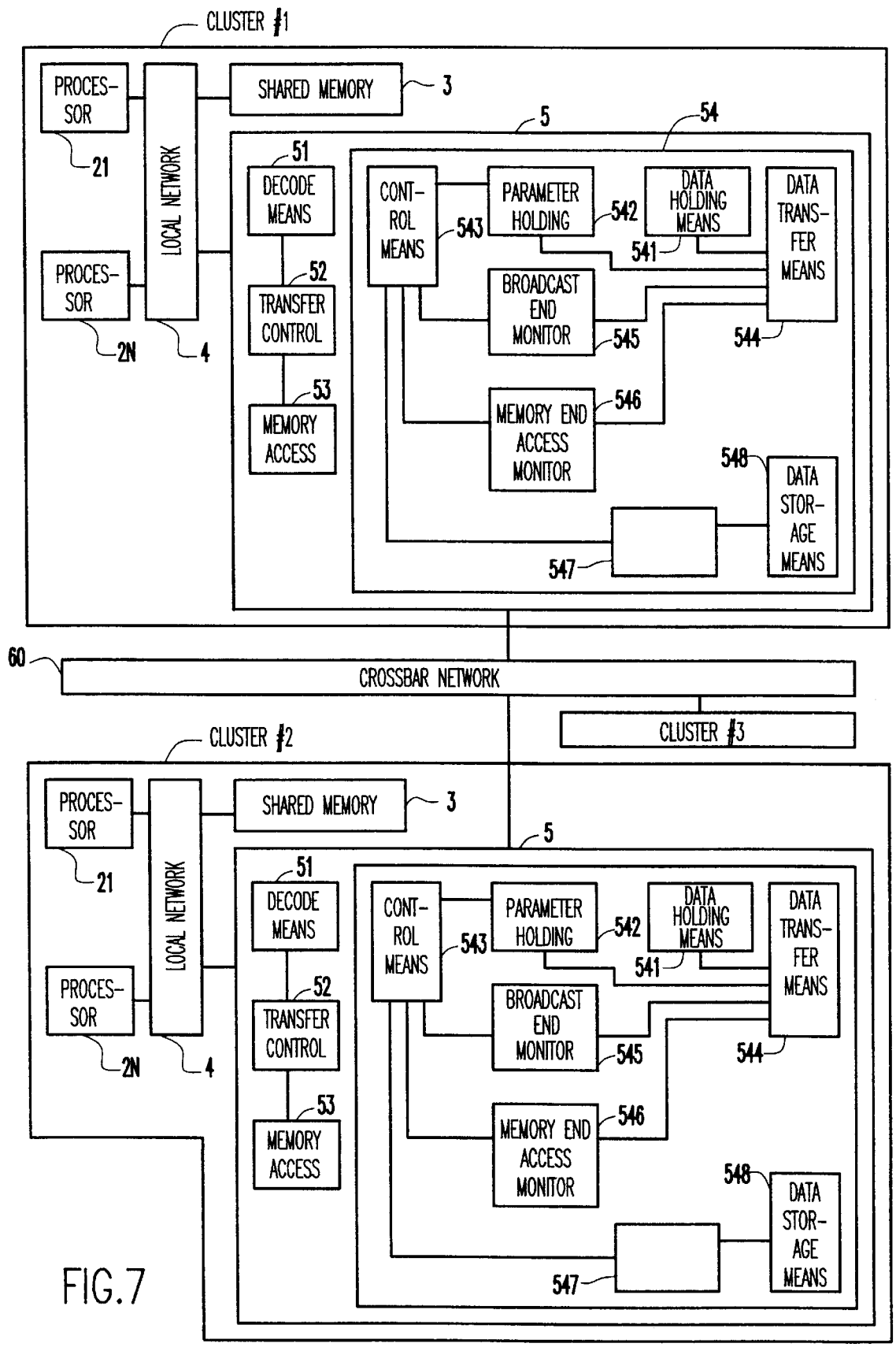
FIG. 7 is a diagram for explaining the operation of the first embodiment of the invention.
Figure 8:
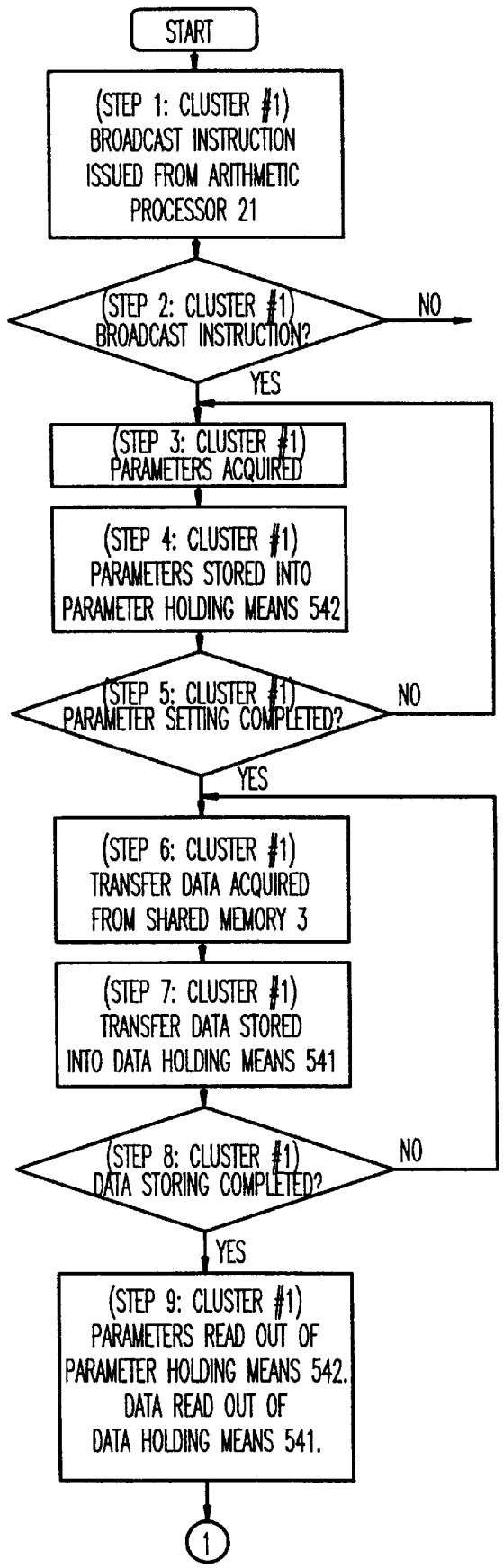
FIG. 8 is a flow chart for explaining the operation of the first embodiment of the invention.

Referring to FIGS. 7 and 8, at step 1, the arithmetic processor 21 of the cluster #1 issues a broadcast instruction.

At step 2, the instruction decoding means 51 determines whether or not this instruction is a broadcast instruction. If the issued instruction is determined to be a broadcast instruction, step 3 will be executed.

At step 3, the transfer control means 52 instructs the shared memory access means 53 to acquire parameters. The shared memory access means 53 acquires from the shared memory 3 and the arithmetic processor 21 necessary information for the generation of parameters, and generates parameters on the basis of the information so acquired.

At step 4, the shared memory access means stores the generated parameters into the parameter holding means 542.

At step 5, the transfer control means 52 determines whether or not all the parameters have been set in the parameter holding means 542, in which a parameter corresponding to each of the destination clusters should be set. In this embodiment, two parameters corresponding to clusters #2 and #3 are set. When the setting of all the parameters has been completed, step 6 is executed. Otherwise, steps 3 and 4 are executed again.

At step 6, the transfer control means 52 instructs the shared memory access means 53 to acquire data to be transferred. In response to this instruction, the shared memory access means 53 acquires from the shared memory 3 the data to be transferred.

At step 7, the shared memory access means 53 stores the acquired data into the data holding means 541.

At step 8, the transfer control means 52 determines whether or not the storing of all the data has been completed. If the storing of all the data has been completed, step 9 will be executed. Otherwise, steps 6 and 7 are executed again.

Each of steps 6 through 8 is executed only once per broadcast.

At step 9, the control means 543 reads the parameters and data to be transmitted out of the parameter holding means 542 and the data holding means 541, respectively. The read-out data are sent out to the data transfer means 544.

Figure 9:
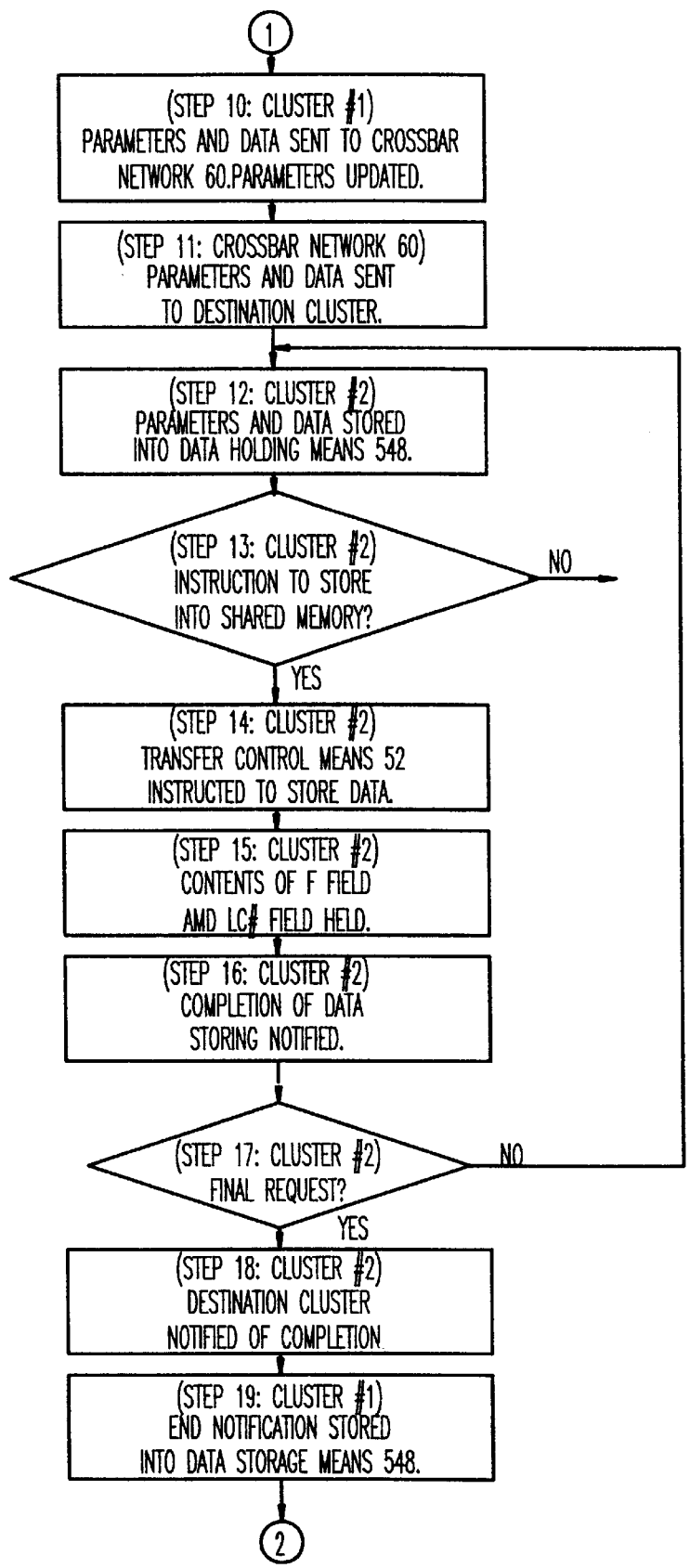
FIG. 9 is a flow chart for explaining the operation of the first embodiment of the invention.

Referring now to FIGS. 7 and 9, at step 10, the data transfer means 544 sends out parameters and data to the crossbar network 60. If the data are divided into a plurality of data blocks, the updating means 5423 generates, in accordance with the above-described procedure, the parameter for the data block to be transmitted next. The generated parameter is set in the parameter buffer 5422.

At step 11, the crossbar network 60 sends out a parameter and data to a cluster designated by the RC# field in the parameter. Here, the parameter and data are supposed to be sent first to the cluster #2 and, afterwards, to the cluster #3.

At step 12, the data storage means 548 in the cluster #2 receives and stores therein the parameter and data.

At step 13, the instruction decoding means 547 determines the content of the R/W filed of the received parameter. If the R/W field indicates storing, step 14 will be executed.

At step 14, the control means 543 instructs the transfer control means 52 to store data. In accordance with this instruction, the transfer control means 52 stores the data in the data storage means 548 into the shared memory 3. The storing position is at an address indicated by the ADD field of the parameter.

At step 15, the shared memory access end monitoring means 546 holds the contents of the F field and the LC# field of the parameter.

At step 16, the transfer control means 52 notifies the shared memory access end monitoring means 546 of the completion of data storing.

At step 17, the shared memory access end monitoring means 546 determines the completion of data transfer. If the F field of the parameter corresponding to the data block stored at steps 13 and 14 is set to "1", step 18 will be executed. Otherwise, steps 12 to 16 are executed for the succeeding data block.

At step 18, the shared memory end monitoring means 546 reports the completion of data transfer to the transfer origin cluster. The origin cluster is indicated by the LC# field of the parameter. In this case, the origin cluster is the cluster #1.

At step 19, the end notification information sent out from the cluster #2 is stored into the data storage means 548 of the cluster #1 via the crossbar network 60.

Figure 10:
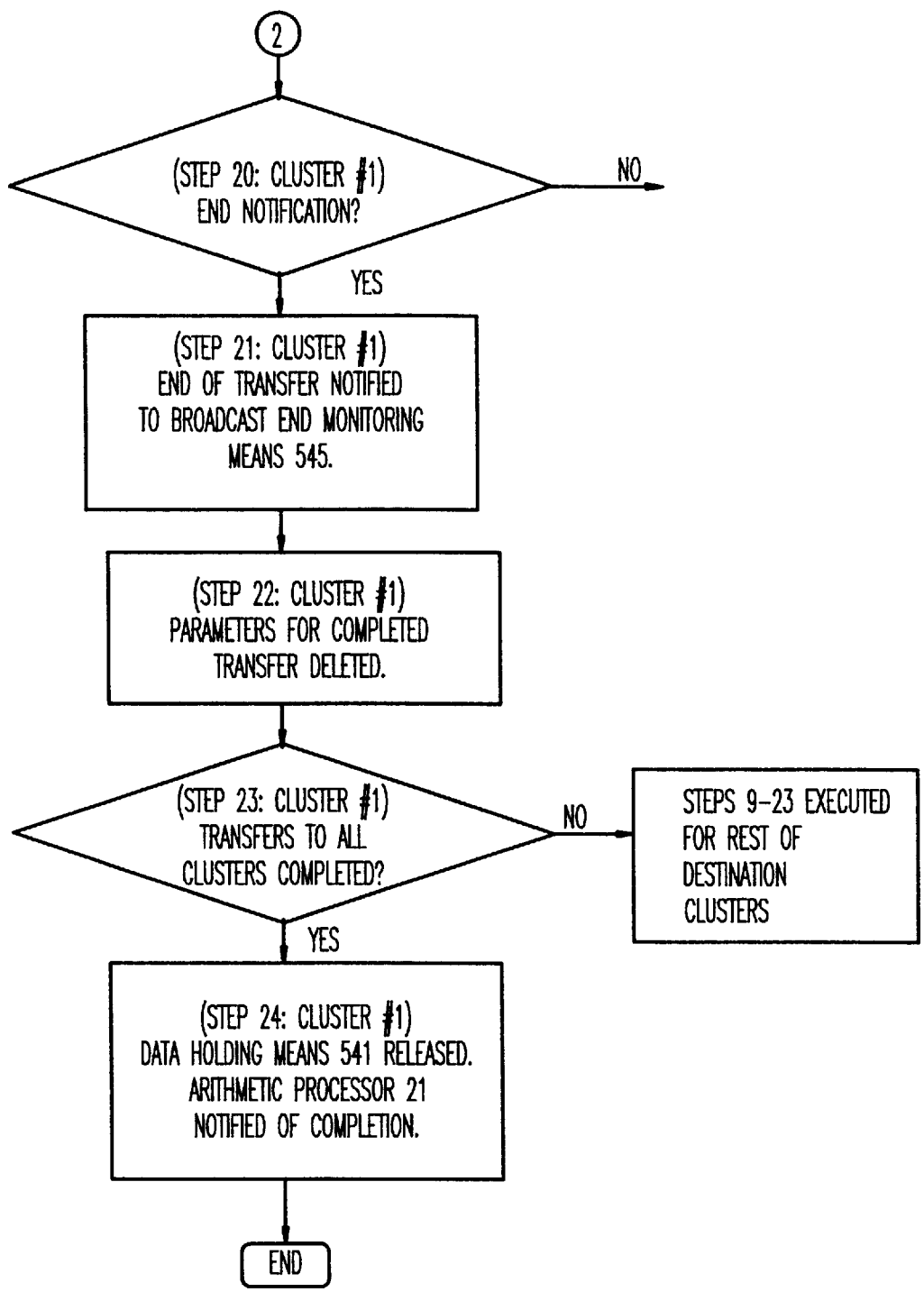
FIG. 10 is a flow chart for explaining the operation of the first embodiment of the invention.

Referring now to FIGS. 7 and 10, at step 20, the instruction decoding means 547 determines whether or not the information in the data storage means 548 is end notification information. If it is, step 21 will be executed.

At step 21, the instruction decoding means 547 notifies the broadcast end monitoring means 545 of the completion of data transfer to the cluster #2.

At step 22, the parameter corresponding to the cluster whose transfer has been completed is delete from the parameter holding means 542.

At step 23, the broadcast end monitoring means 545 determines whether or not the transfer to every cluster has been completed. Specifically, the broadcast end monitoring means 545 determines whether or not all the destination clusters have sent signals notifying the completion of data reception. If it has, step 24 will be executed. Otherwise, steps 9 through 23 will be repeated for any cluster to which data have not yet been transferred. At this time, steps 3 through 8 are not repeated, and this means that data are read out of the shared memory 3 no more than once.

At step 24, the control means 543 releases the data holding means 541. The control means 543 further notifies the arithmetic processor 21 of the completion of broadcast.

Thus, in the first preferred embodiment, the data to be broadcast are read out of the shared memory 3, and stored into the data holding means 541. When these data are to be sent out to a plurality of clusters, the data are read out of the data holding means 541 instead of the shared memory 3. The data are read out of the shared memory 3 only once.

Figure 11:
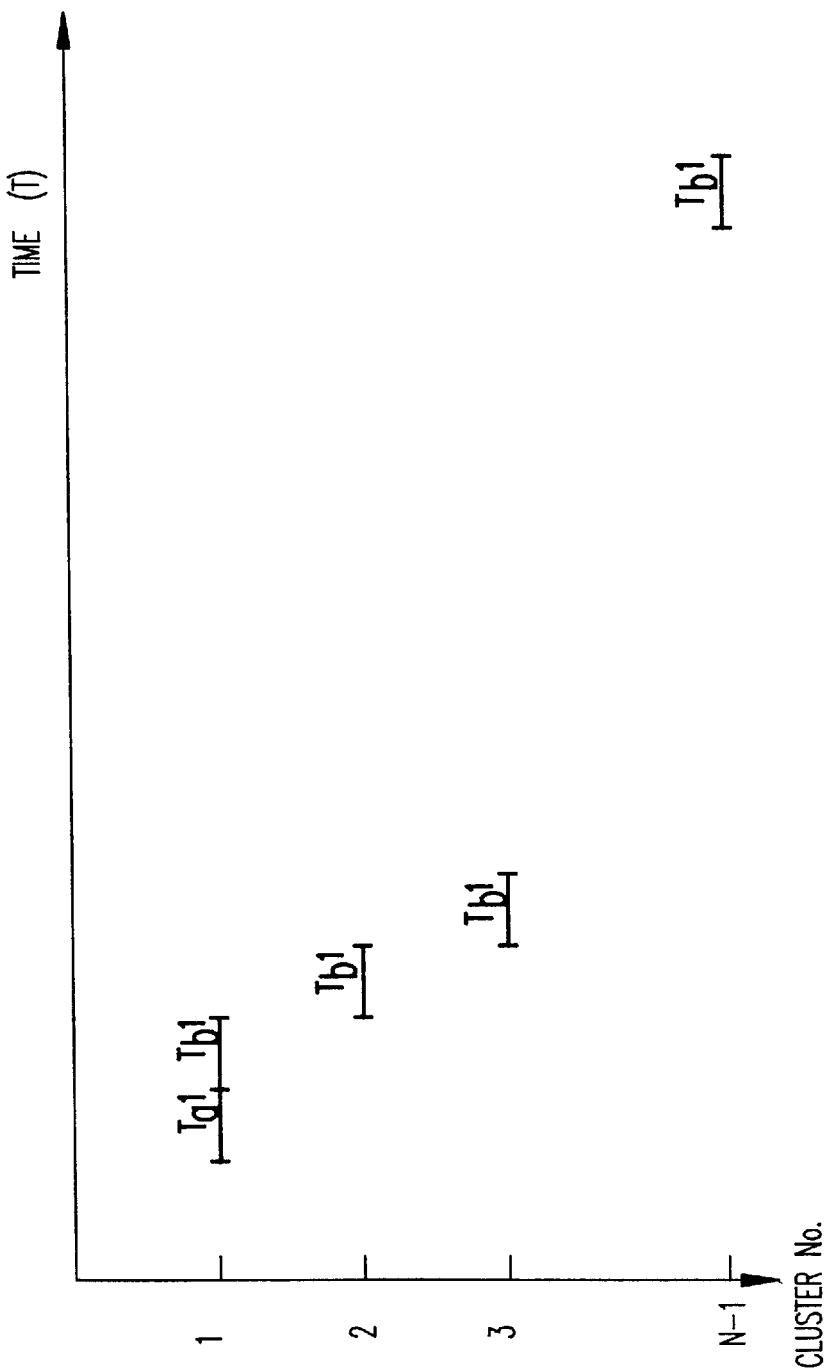
FIG. 11 is a diagram for explaining the time taken by a broadcast transfer in the first embodiment of the invention.

Referring to FIG. 11, equation T1=Ta1+Tb1×(N−1) holds where T1 is the total length of time taken to execute an instruction to broadcast data to (N−1) destination clusters, Ta1 is the time taken to read the data out of the shared memory 3, and Tb1 is the time taken by the read-out data to be transferred until they are written into the shared memory 3 in a given cluster. Time Ta1 is taken only once when the data are transferred to the cluster #1, but not taken when they are transferred to any other cluster because the data stored in the data holding means 541 are sent out. Thus, this first embodiment can broadcast data in a shorter period of time than any conventional information processing system does.

Incidentally, in the above-described embodiment of the invention, a field indicating the type of transfer may be provided additionally in the parameter. There can be at least two types of transfer: transfer between two points and broadcast transfer.

Next will be described a second preferred embodiment of the present invention with reference to drawings.

Figure 12:
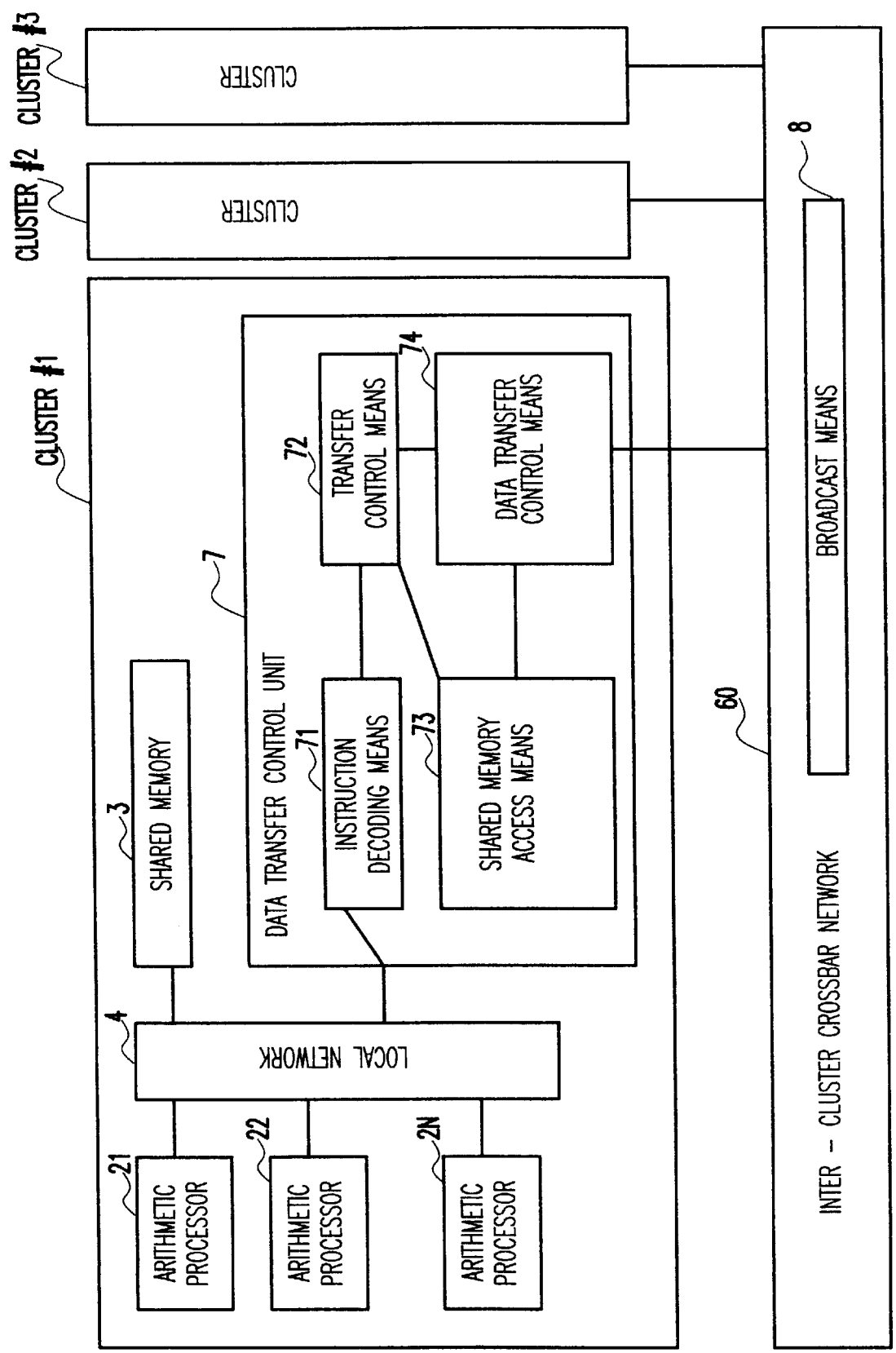
FIG. 12 is a block diagram illustrating the structure of a second preferred embodiment of the present invention.

Referring to FIG. 12, in the second embodiment of the invention, a data transfer control unit 7 is provided in each cluster in place of the data transfer control unit 5 in the first embodiment. Broadcast means 8 is further provided in the crossbar network 60.

Figure 13:
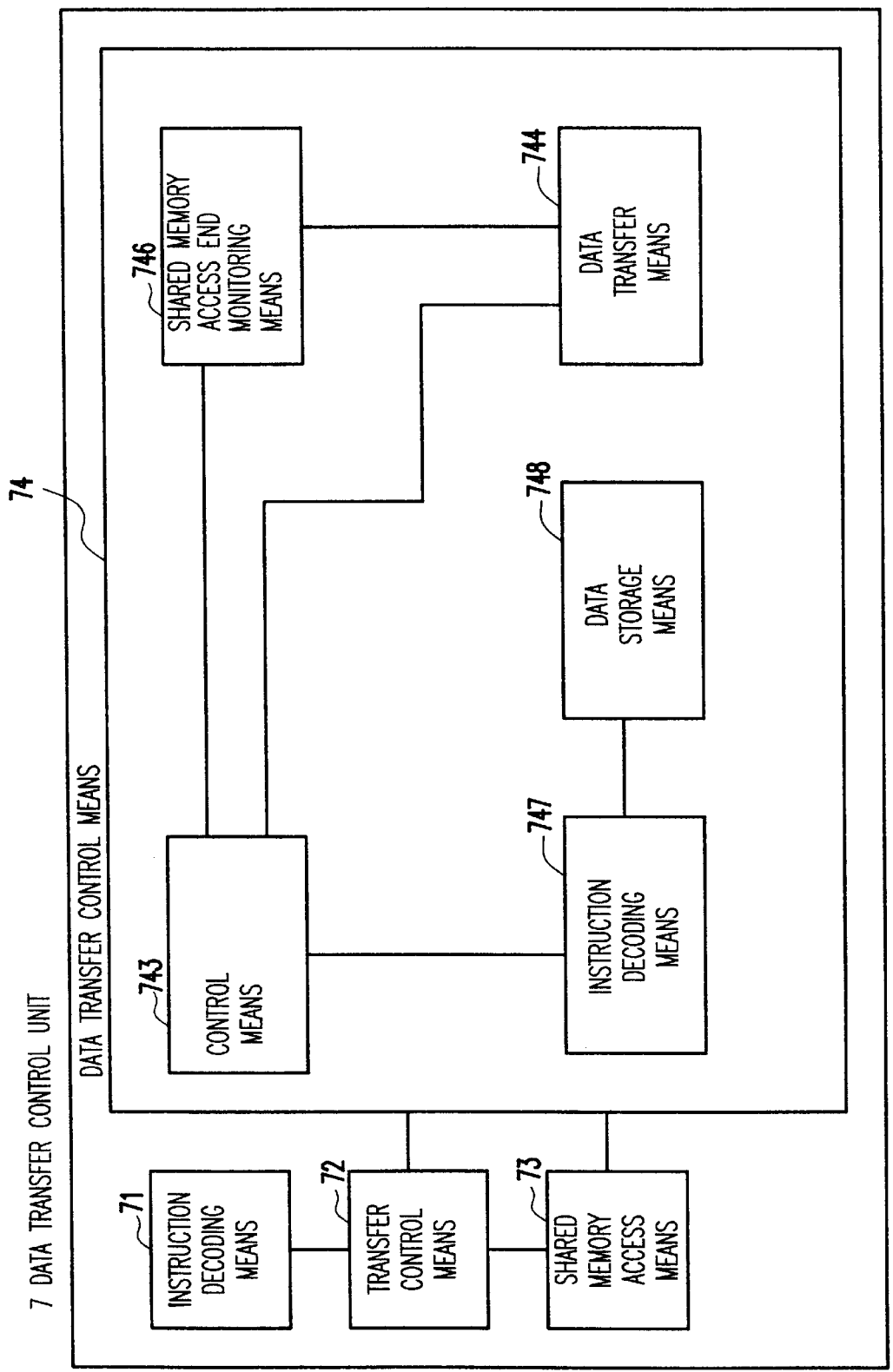
FIG. 13 is a block diagram illustrating the detailed structure of data transfer means 74.

Referring now to FIG. 13, the data transfer control unit 7 comprises instruction decoding means 71, transfer control means 72, shared memory access means 73 and data transfer control means 74. The shared memory access means 73 executes reading out of and writing into the shared memory 3 via the local network 4. The instruction decoding means 71 receives via the local network 4 and decodes instructions issued by the arithmetic processors 21 through 2N. If such an instruction is a broadcast instruction, the instruction decoding means 71 instructs the transfer control means 72 to execute broadcasting. The data transfer control means 74 transfers data to another cluster or clusters. The transfer control means 72 controls the actions of the instruction decoding means 71, the shared memory access means 73 and the data transfer control means 74.

The data transfer control means 74 comprises control means 743, data transfer means 744, shared memory access end monitoring means 746, instruction decoding means 747 and data storage means 748. The shared memory access end monitoring means 746 detects completion of an access to the shared memory 3. The instruction decoding means 747 determines the type of information stored into the data storage means 748. The data storage means 748 acquires data from the crossbar network 60 and stores them. The data transfer means 744 transfers and sends out to the crossbar network 60 data read out of the shared memory 3.

Figure 14:
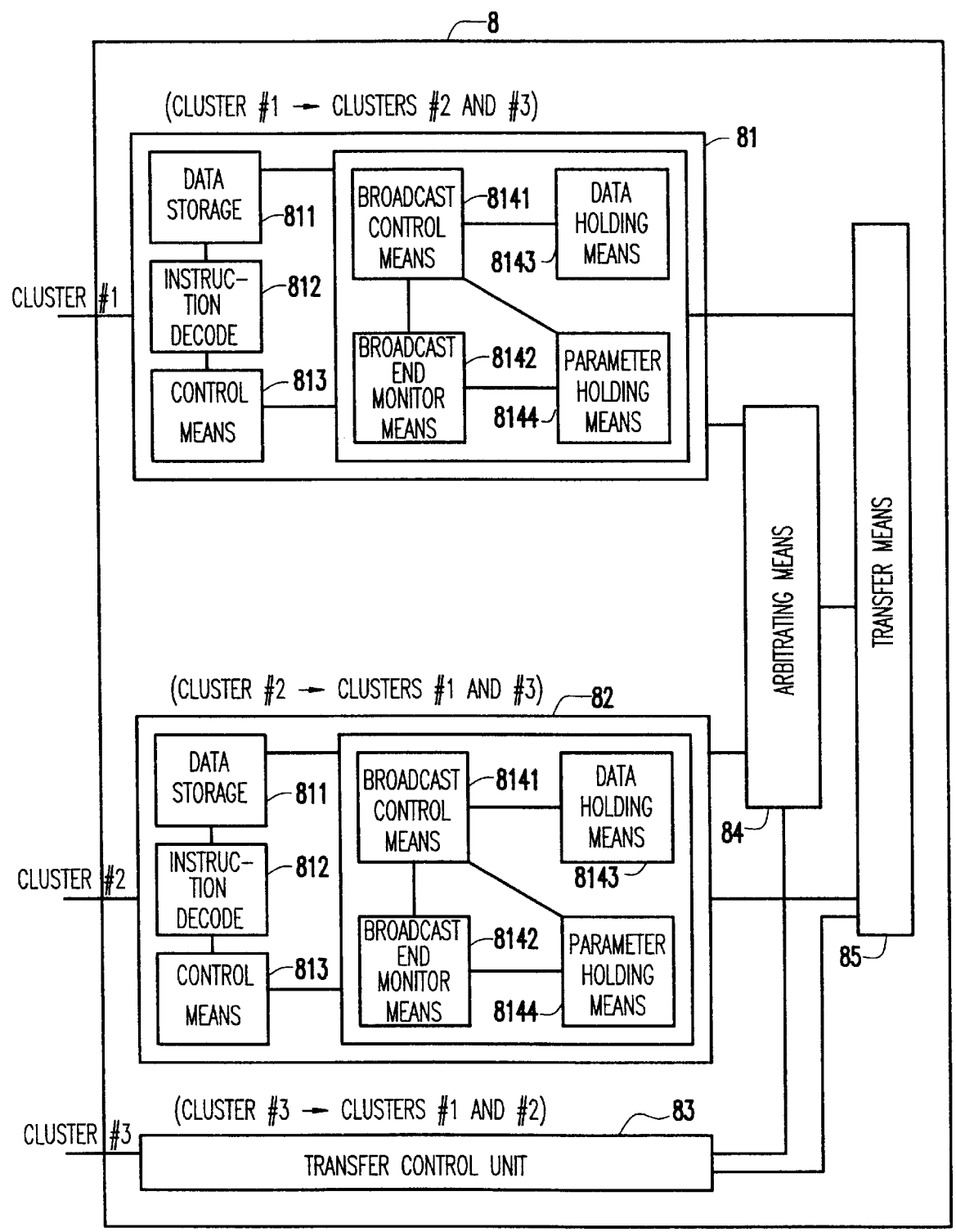
FIG. 14 is a block diagram illustrating the detailed structure of broadcast means 8.

Referring to FIG. 14, the broadcast means 8 comprises data transfer control units 81 through 83, which correspond to the clusters #1 through #3, respectively. The broadcast means 8 further has arbitrating means 84 and transfer means 85. The arbitrating means 84 arbitrates between a plurality of transfer requests from the clusters #1 through #3. The transfer means 85 sends out data to the destination cluster in accordance with the transfer request selected by the arbitrating means 84.

The data transfer control unit 81 comprises data storage means 811, instruction decoding means 812, control means 813 and data transfer means 814. The data storage means 811 temporarily holds data to be broadcast, which are received from the corresponding cluster. The instruction decoding means 812 determines the type of the information received from the corresponding cluster. There are at least two types of information: parameters and data. The data transfer means 814 transfers the data received from the corresponding cluster to the destination cluster. The control means 813 controls the actions of the data storage means 811, the instruction decoding means 812 and the data transfer means 814.

The data transfer means 814 comprises broadcast control means 8141, broadcast end monitoring means 8142, data holding means 8143 and parameter holding means 8144. The data holding means 8143 holds the data received from the corresponding cluster. The parameter holding means 8144 holds the parameter received from the corresponding cluster. The broadcast end monitoring means 8142 monitors the completion of broadcast and, upon completion of broadcast, sends a notification of completion to the corresponding cluster.

Figure 15:
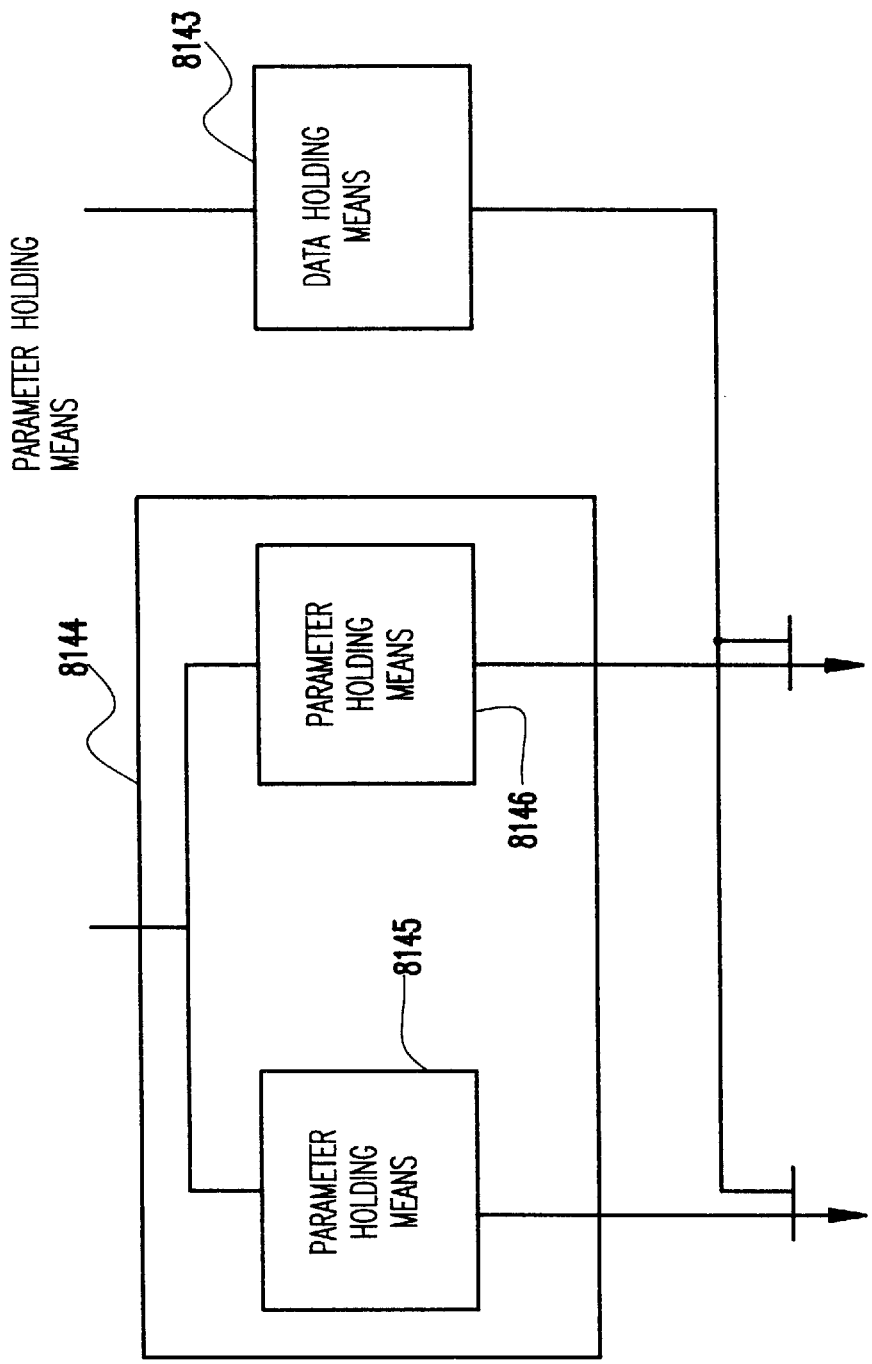
FIG. 15 is a block diagram illustrating the detailed structure of parameter holding means.

Referring to FIG. 15, the parameter holding means 8144 comprises parameter holding means 8145 and 8146. The parameter holding means 8145 and 8146 store parameters corresponding to the clusters #2 and #3. The structure of the parameter holding means 8145 and 8146 is substantially the same as that of the parameter holding means 542 illustrated in FIG. 5. The structure of the data holding means 8143 is substantially the same as that of the data holding means 541 shown in FIG. 6.

Figure 16:
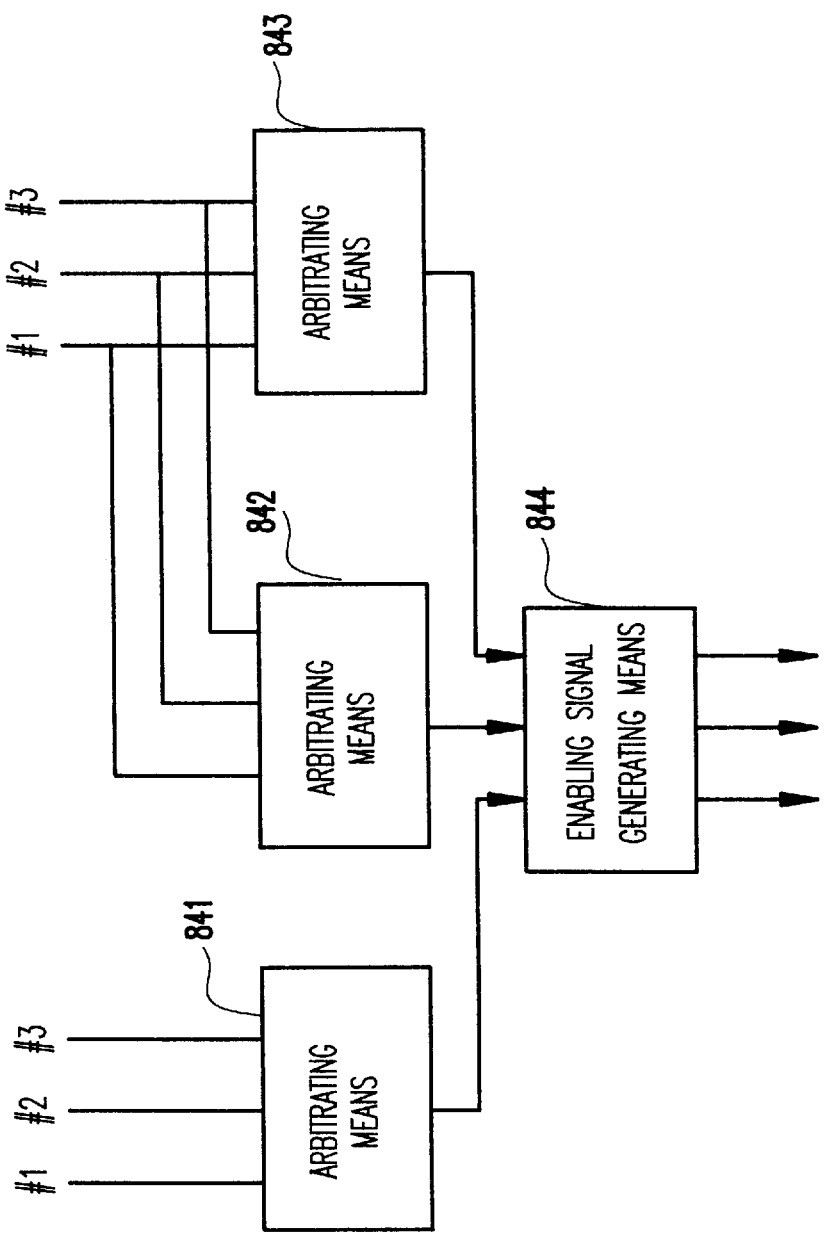
FIG. 16 is a block diagram illustrating the detailed structure of arbitrating means 84.

Referring now to FIG. 16, the arbitrating means 84 comprises first arbitrating means 841, second arbitrating means 842, third arbitrating means 843 and enabling signal generating means 844. The first arbitrating means 841 arbitrates between requests for communication between two points (point-to-point communication).

The first arbitrating means 841 receives requests for point-to-point communication and transfer destinations from the clusters #1 through #3, and selects one of these requests in accordance with a predetermined order of priority. The selected request is notified to the enabling signal generating means 844.

The second arbitrating means 842 arbitrates between requests for point-to-point communication and for broadcast communication. The second arbitrating means 842 receives requests for point-to-point communication and for broadcast communication from the clusters #1 through #3, and selects one of these requests in accordance with a predetermined order of priority. It is up to the designer to give priority whether to point-to-point communication or to broadcast communication. The result of arbitration is notified to the enabling signal generating means 844.

The third arbitrating means 843 arbitrates between requests for broadcast communication. The third arbitrating means 843 receives requests for broadcast communication from the clusters #1 through #3, and selects one of these requests in accordance with a predetermined order of priority. The result of arbitration is notified to the enabling signal generating means 844.

The enabling signal generating means 844 sends an enabling signal to the cluster to which a data transfer has been enabled in accordance with the information notified from the first through third arbitrating means 841 through 843.

Next will be described the operation of the second preferred embodiment with reference to drawings. In this instance of operation, the arithmetic processor 21 of the cluster #1 requests broadcasting to the clusters #2 and #3.

Figure 17:
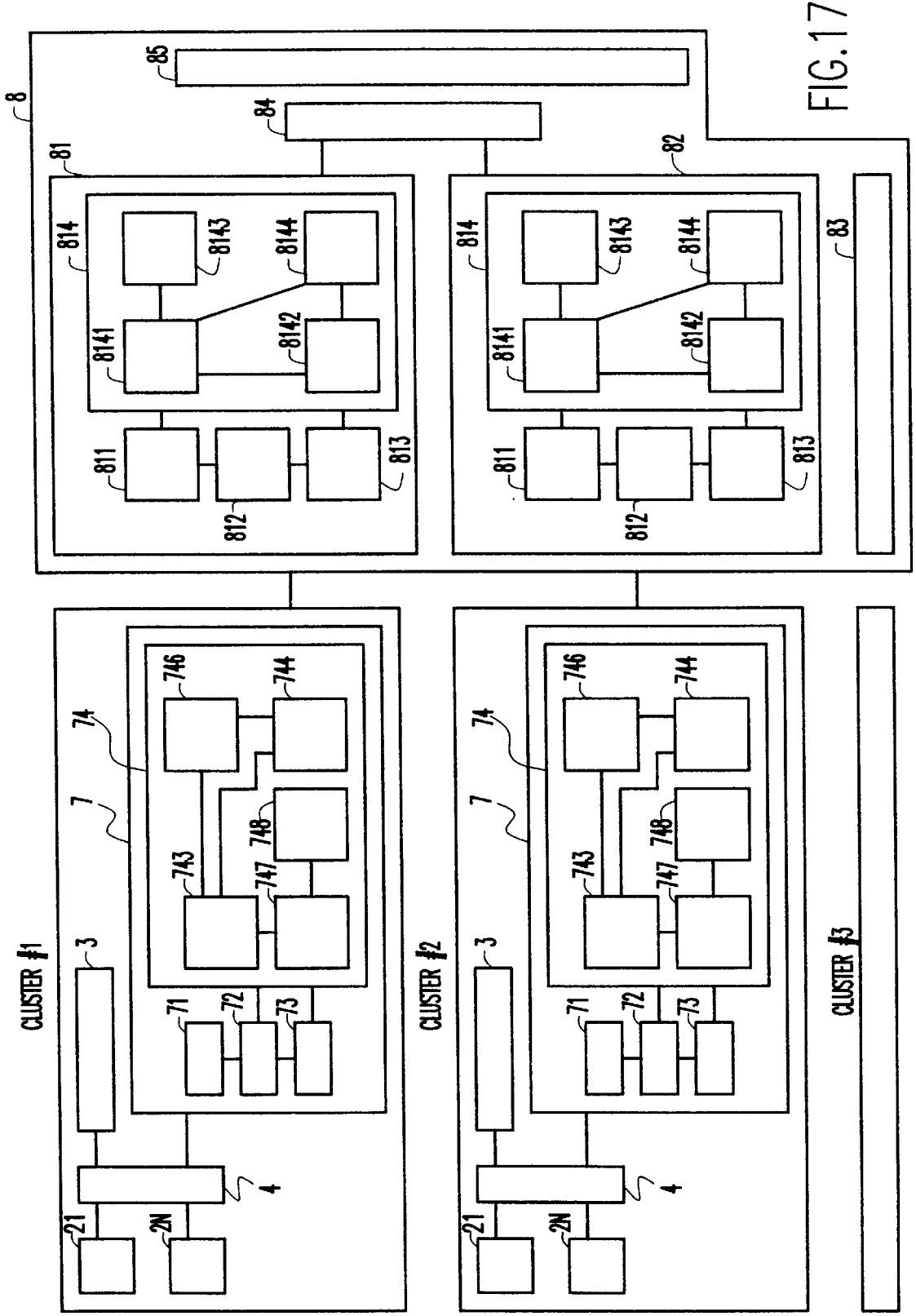
FIG. 17 is a diagram for explaining the operation of the second embodiment of the invention.
Figure 17A:
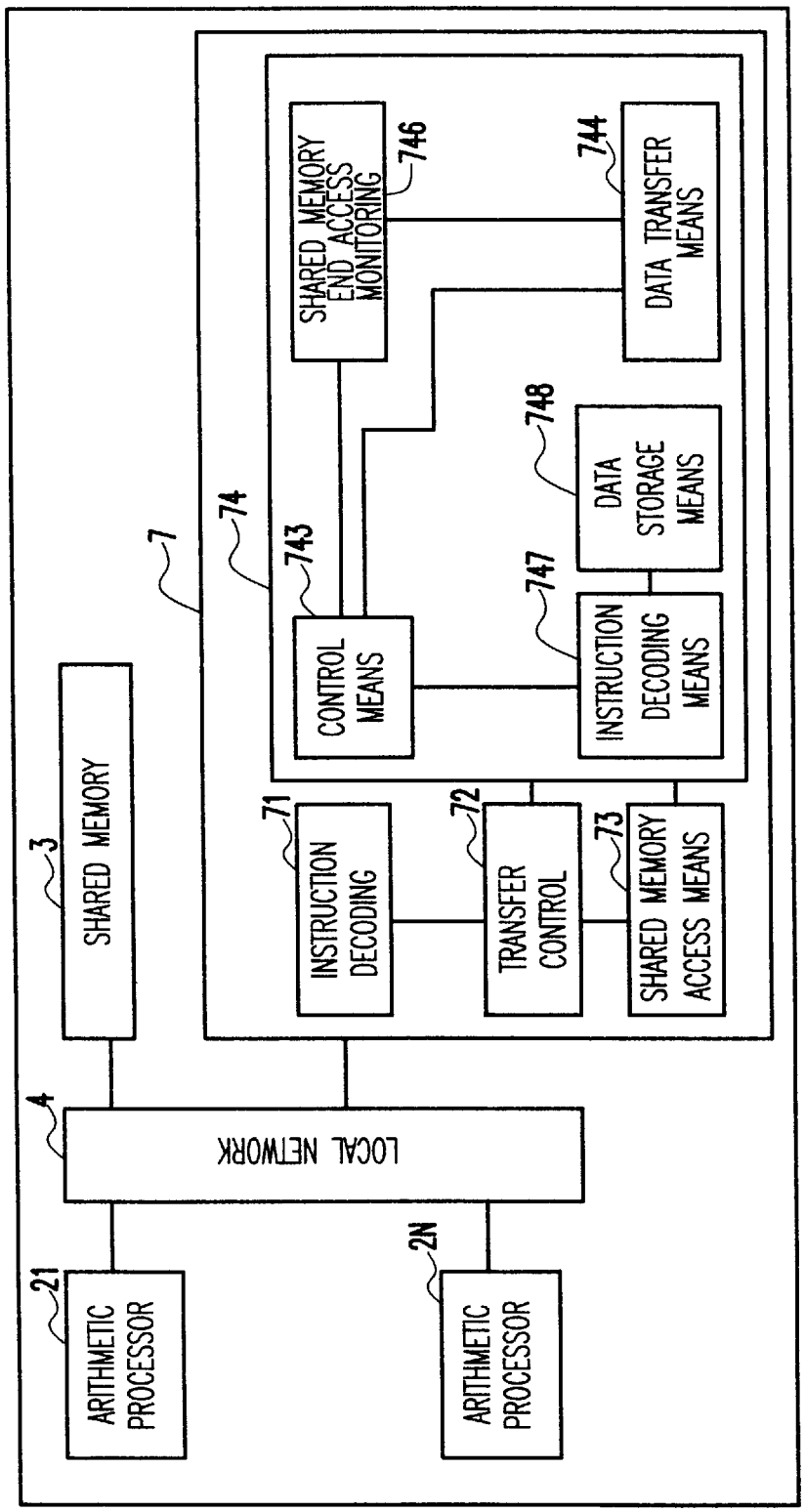
FIG. 17A is an enlargement of one of the clusters shown in FIG. 17.
Figure 21:
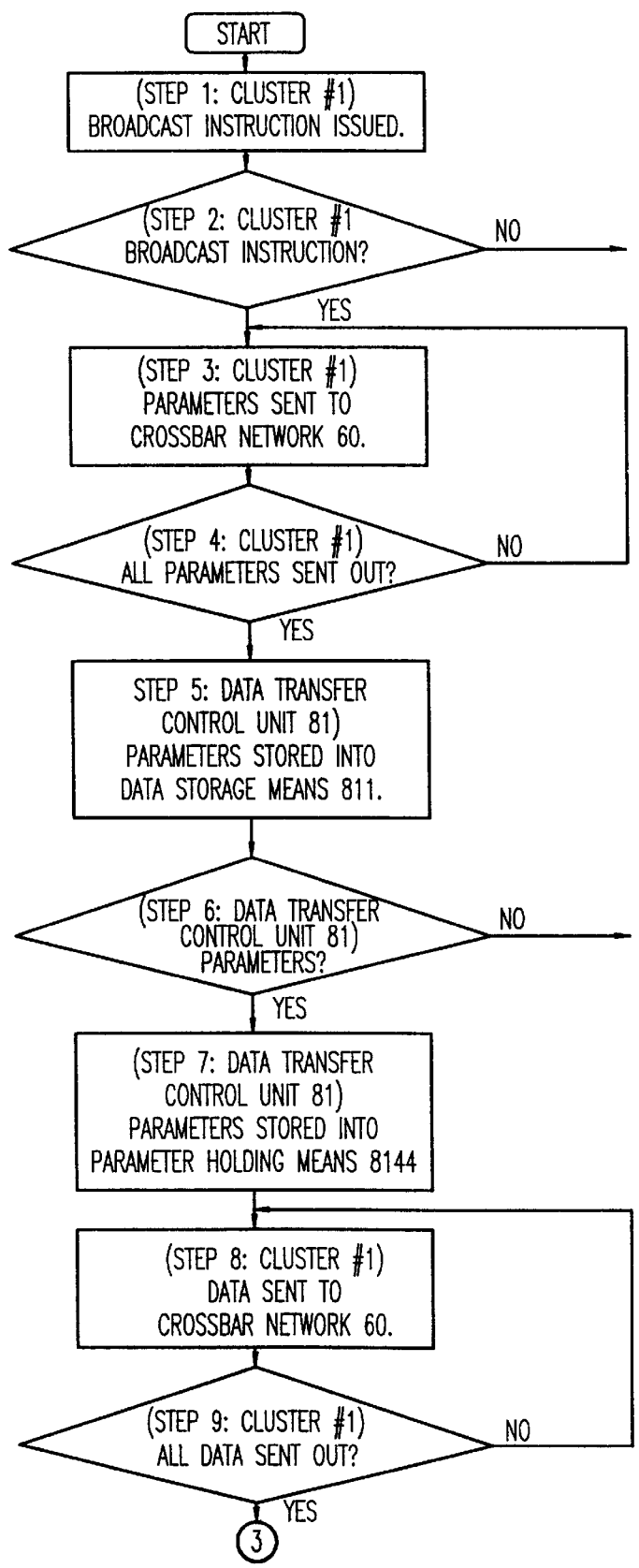
FIG. 21 is a flow chart for explaining the operation of the second embodiment of the invention.

Referring to FIGS. 17 and 21 with FIG. 17A being a labeled enlargement of the cluster #1through #3system, at step 1, the arithmetic processor 21 of the cluster #1 issues an broadcast instruction.

At step 2, the instruction decoding means 71 decodes the instruction issued by the arithmetic processor 21. If this instruction is a broadcasting instruction, step 3 will be executed.

At step 3, the transfer control means 72 instructs the shared memory access means 73 to acquire parameters for the data to be broadcast. In response to this instruction, the shared memory access means 73 acquires information from the shared memory 3 and the arithmetic processor 21. On the basis of the information so acquired, the shared memory access means 73 generates parameters. The generated parameters are sent to the crossbar network 60 by the data transfer means 744. A parameter is generated for each destination cluster. In this instance of operation, two parameters corresponding to the clusters #2 and #3 are generated.

Figure 18:
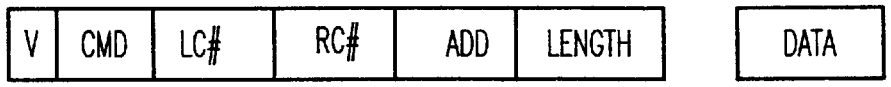
FIG. 18 is a diagram illustrating the parameter format for use in the second embodiment of the invention.
Figure 19:
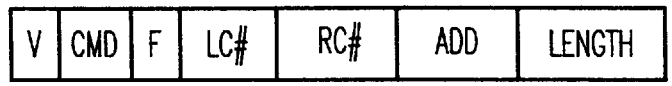
FIG. 19 is a diagram illustrating the parameter format for use in the second embodiment of the invention.

Referring to FIG. 18, each of the parameters sent at step 3 comprises six fields: V, CVD, LC#, RC#, ADD and LENGTH. The V field is a significant bit. The CMD field stores information indicating the type of transfer. There are at least two types of transfer: point-point transfer and broadcast transfer. The LC# field stores information representing the transfer origin cluster number. The RC# field stores information representing the destination cluster number. The ADD field stores the virtual address of the destination cluster. Transfer data are stored from the address represented by the ADD field. The LENGTH field stores the length of the data transferred and the length of data that can be transferred at a time.

Referring again to FIGS. 17 and 21, until sending of all the parameters is completed at step 4, step 3 is repeated.

At step 5, the parameters from the cluster #1 are received by the data transfer control unit 81. The received data are stored into the data storage means 811.

At step 6, the instruction decoding means 812 determines whether or not the information stored into the data storage means 811 are parameters. If it is, step 7 will be executed.

At step 7, the parameters in the data storage means 811 are stored into the parameter holding means 8144. Here, the parameter corresponding to the cluster #2 is stored into the parameter holding means 8145, and that corresponding to the cluster #3, into the parameter holding means 8146.

Figure 20:
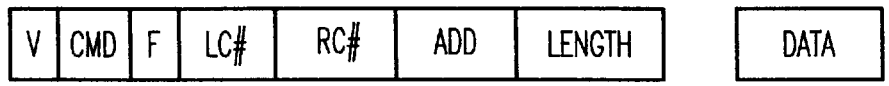
FIG. 20 is a diagram illustrating the parameter format for use in the second embodiment of the invention.

Referring to FIG. 20, an F field is added to each parameter at step 7.

At step 8, the transfer control means 72 instructs the shared memory access means 73 to acquire data to be transferred. In response to this instruction, the shared memory access means 73 reads data but of the shared memory 3. The read-out data are sent to the crossbar network 60.

Until the sending of all the data is completed at step 9, step 8 is repeated.

Figure 22:
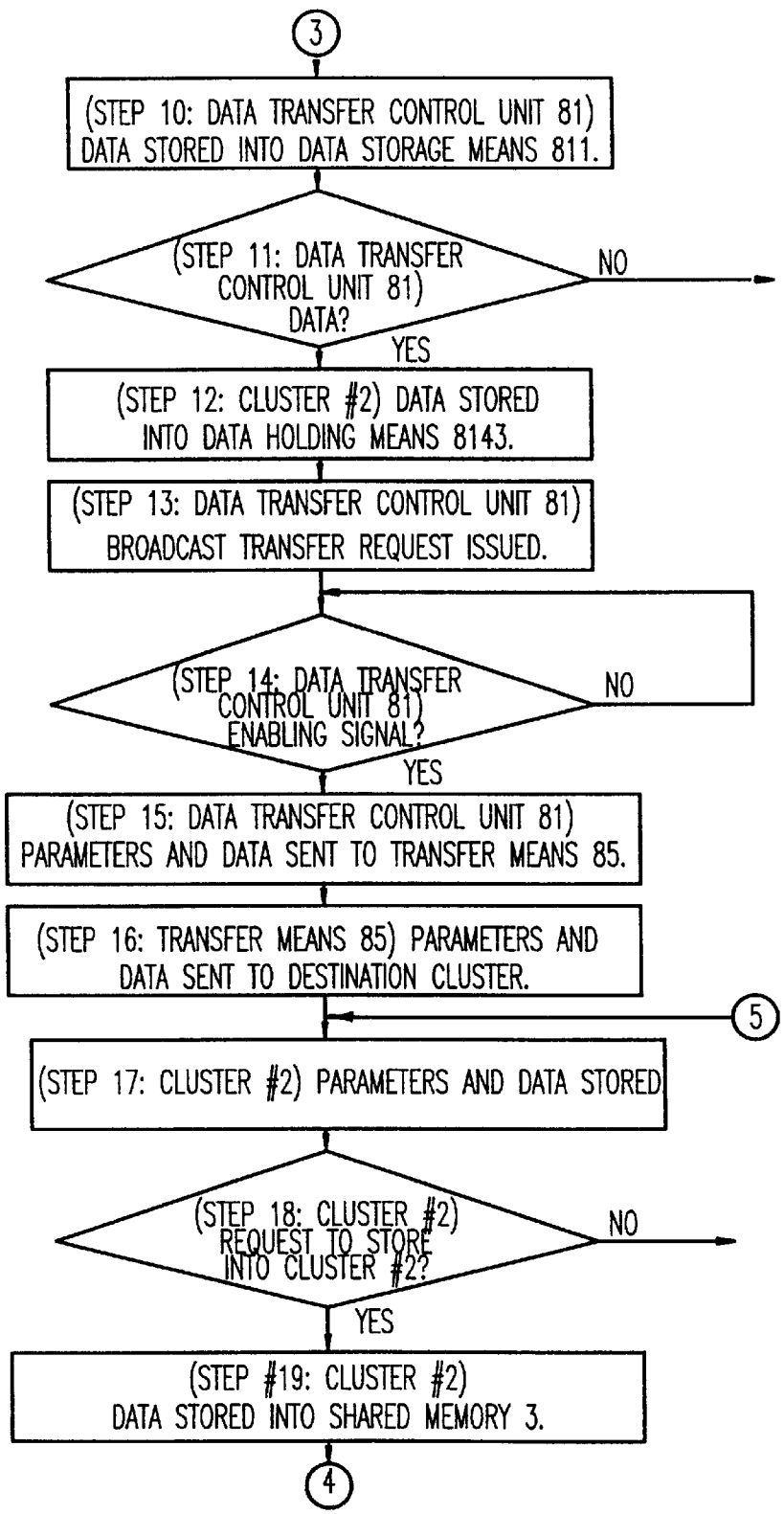
FIG. 22 is a flow chart for explaining the operation of the second embodiment of the invention.

Referring to FIGS. 17 and 22 together, at step 10, the data sent at step 9 are received by the data transfer control unit 81. The received data are stored into the data storage means 811.

At step 11, the instruction decoding means 812 determines whether or not the information stored into the data storage means 811 is data. If the information is found to be data, step 12 will be executed.

At step 12, the data in the data storage means 811 are shifted to the data holding means 8143.

At step 13, the broadcast control means 8141 sends a broadcast transfer request to the arbitrating means 84.

At step 14, the data transfer control unit 81 waits for an enabling signal from the arbitrating means 81. Upon receiving an enabling signal, the data transfer control unit 81 executes step 15.

At step 15, the broadcast control means 8141 acquires parameters and data from the parameter holding means 8144 and the data holding means 8143. The acquired parameters and data are sent to the transfer means 85. When the data are to be divided into a plurality of blocks, after the transfer of a data block the parameters for the data block to be transferred next are generated. This processing is substantially the same as the corresponding processing in the first embodiment. Data blocks are successively sent to the transfer means 85 until the F field of the parameters becomes "1".

At step 16, the transfer means 85 sends data and parameters to the destination cluster indicated by the #RC field of the parameter. As the transfer means 85 includes a crossbar network, the data are simultaneously transferred to a plurality of clusters. In this particular case, the data are transferred to the clusters #2 and #3 at the same time.

Referring now to FIG. 20, the form of the parameters sent out at step 16 is the same as that of the parameters stored in the parameter holding means 8144.

Referring again to FIGS. 17 and 22, at step 17, the destination clusters receive the parameters and the data. Hereinafter, the actions of the cluster #2 alone after its reception of these parameters and data will be described. The actions of the cluster #3 are substantially the same as those of the cluster #2. The data storage means 748 of the cluster #2 stores the data received from the transfer means 85.

At step 18, the instruction decoding means 747 decodes the contents of the parameter stored into the data storage means 748. If the parameter indicates data storage into the cluster #2, step 19 will be executed.

At step 19, the control means 743 instructs the shared memory access means 73 to store the data in the data storage means 748. In response to this instruction, the shared memory access means 73 stores the data in the data storage means 748 into the shared memory 3. The data are stored at an address indicated by the ADD field of the parameter.

Figure 23:
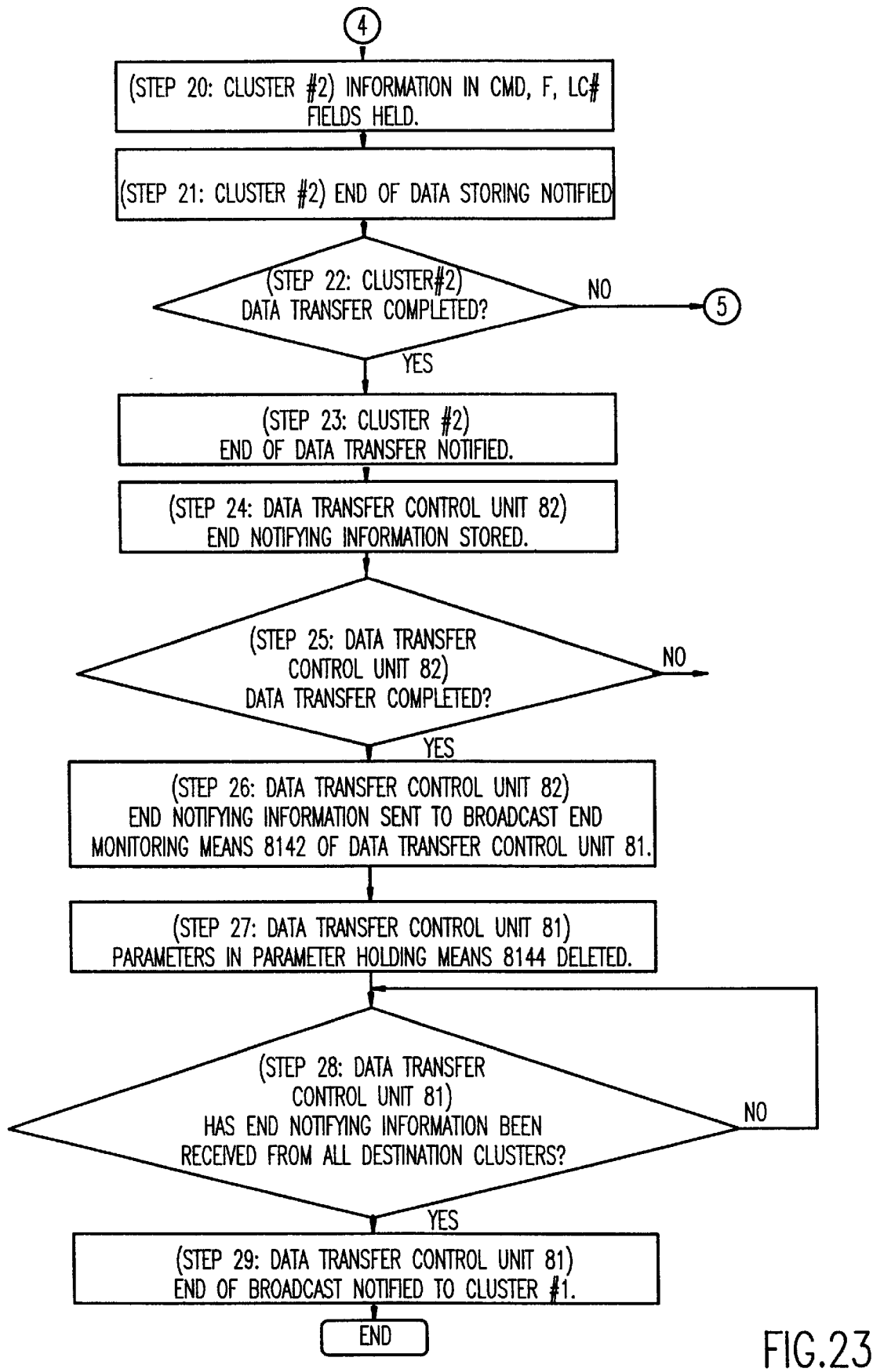
FIG. 23 is a flow chart for explaining the operation of the second embodiment of the invention.

Referring to FIG. 23 at step 20, the contents of the CMD, F and LC# fields in the parameter are held.

At step 21, the shared memory access means 73 notifies the shared memory access end monitoring means 746 of the completion of data storage.

At step 22, the shared memory access end monitoring means 746 determines whether or not a data transfer has been completed. This determination is accomplished on the basis of the content of the F field of the transferred data. If the transfers of all the data blocks have been completed, step 23 will be executed. Otherwise, steps 17 through 21 are repeated.

Referring now to FIGS. 17 and 23, at step 23, the shared memory access end monitoring means 746 notifies the cluster #1 of the completion of data transfer via the data transfer means 744 and the crossbar network 60.

At step 24, information sent by the cluster #2 to notify completion is received by the data transfer control unit 82 corresponding to the cluster #2. The end notifying information that has been received is stored into the data storage means 811 of the data transfer control unit 82.

At step 25, the instruction decoding means 812 of the data transfer control means 82 determines the contents of information stored into the data storage means 811. If the information notifies completion, step 26 will be executed.

At step 26, if the end notifying information notifies the completion of broadcast transfer, the control means 813 sends the end notifying information to the broadcast end monitoring means 8142 of the data transfer control unit 81 via the arbitrating means 84. If the end notifying information notifies the completion of point-to-point transfer, the control means 813 sends the end notifying information to the transfer origin cluster via the transfer means 85.

At step 27, the broadcast end monitoring means 8142 of the data transfer control unit 81 receives the end notifying information. The parameter corresponding to the end notifying information in the parameter holding means 8144 is deleted.

At step 28, the broadcast end monitoring means 8142 determines whether or not end notifying information has been received from all the destination clusters. If it has, step 29 will be executed.

At step 29, the broadcast end monitoring means 8142 notifies the cluster #1 of the completion of broadcast.

As described above, in this second preferred embodiment of the invention, data can be simultaneously transferred to a plurality of clusters.

Figure 24:
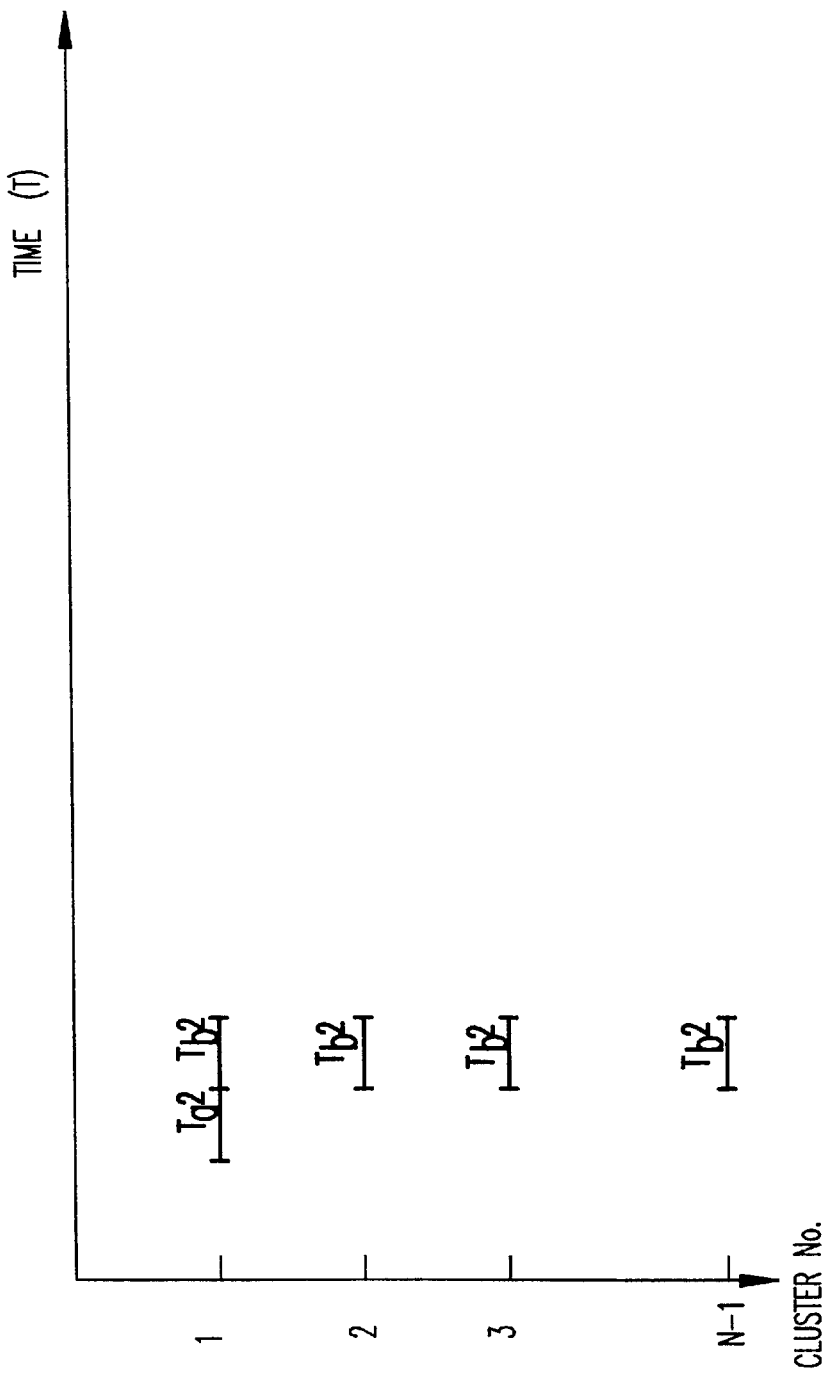
FIG. 24 is a diagram for explaining the time taken by a broadcast transfer in the second embodiment of the invention.

Referring to FIG. 24, equation T2=Ta2+Tb2 holds where T2 is the total length of time taken to execute broadcasting, Ta2 is the time taken to read the data out of the shared memory 3, and Tb2 is the time taken by the read-out data to be transferred until they are written into the shared memory 3 in a given cluster.

As hitherto described, the information processing system according to the present invention read data out of the main memory no more than once per broadcast executed, and accordingly permits data to be broadcast in a short period of time.

Furthermore, the information processing system according to the invention can transfer data at high speed because no other cluster intervenes on the path of transfer to the destination cluster.

Moreover, the information processing system according to the invention involves no increase in hardware volume because no bus dedicated to broadcasting is required.

In the information processing system according to the invention, furthermore, the data transfer control unit 5, instead of an arithmetic processor, transfers data. Therefore, no data transfer can interrupt processing by the arithmetic processor.

What is claimed is:

1. A multi-cluster computer system including a plurality of clusters and inter-cluster connection means for connecting said plurality of clusters, each of said plurality of clusters comprising:

a plurality of processors, each of said plurality of processors having means for generating a broadcast request, said broadcast request identifying a broadcast data to be broadcast and identifying a plurality of destination clusters from said plurality of clusters;

a shared memory for storing data and for outputting the broadcast data in response to said broadcast request;

intra-cluster connection means for connecting each of said plurality of processors to said shared memory;

data holding means for receiving and holding the broadcast data output by the shared memory for successive repeated broadcast to said destination clusters;

shared memory access means for transferring the broadcast data from said shared memory to said data holding means in response to one of said plurality of processors generating said broadcast request; and data transfer means for transferring the broadcast data from said data holding means through said inter-cluster connection means, to said plurality of destination clusters identified by said broadcast request, one after another for a single access to said shared memory in response to said broadcast reguest.

2. A multi-cluster computer system according to claim 1, each of said clusters further comprising:

data storage means for receiving the broadcast data from another of said clusters through said inter-cluster connection means and for storing the received broadcast data in said shared memory.

3. A multi-cluster computer system according to claim 1, each of said plurality of clusters further comprising parameter holding means for storing parameters for each of the destination clusters, each of said parameters including information indicative of a corresponding destination cluster and an address in said shared memory at which the broadcast data is stored, and wherein said data transfer means transfers the broadcast data to a destination cluster along with a corresponding one of the parameters.

4. A multi-cluster computer system according to claim 1, wherein said data transfer means divides the broadcast data into a plurality of data blocks and transfers the data blocks to the destination clusters, and wherein each of said plurality of clusters comprises parameter generating means for generating parameters for the data blocks by repeatedly adding the length of the data blocks to the address in the parameters stored in said parameter holding means.

5. A multi-cluster computer system according to claim 1, wherein each of said plurality of clusters posts reception of the broadcast data when the broadcast data is received therein, and wherein each of said plurality of clusters comprises broadcast end monitoring means for determining whether all of the destination clusters post reception of the broadcast data.

6. A multi-cluster computer system including:

a plurality of clusters, each said cluster comprising:

a shared memory a processor having means for generating a broadcast request, said broadcast request identifying data in said shared memory for broadcasting to a plurality of destination clusters and identifying said plurality of destination clusters, means for retrieving and transmitting broadcast data from said shared memory corresponding to said broadcast request; and inter-cluster connection means for connecting said plurality of clusters, said inter-cluster connection means comprising:

data holding means for receiving and storing said broadcast data received from one of said plurality of clusters, and data transfer means for transferring the stored broadcast data from said data holding means to said plurality of destination clusters for a single transfer of said stored broadcast data in response to said broadcast request.

7. A multi-cluster computer system according to claim 6, wherein said inter-cluster connection means further comprises parameter holding means for storing parameters for each of the destination clusters, each of said parameters including information indicative of a corresponding destination cluster and a destination address in said shared memory at which the broadcast data is stored, and wherein said data transfer means transfers the broadcast data to a destination cluster along with corresponding one of the parameters.

8. A multi-cluster computer system according to claim 6, wherein said data transfer means divides the broadcast data into a plurality of data blocks and transfers the data blocks to the destination clusters, and wherein said data transfer means comprises parameter generating means for generating a parameter for each of the data blocks by repeatedly adding the length of the data blocks to the address in the parameter stored in said parameter holding means.

9. A multi-cluster computer system according to claim 6, wherein each of said plurality of clusters posts reception of the broadcast data when the broadcast data is received therein, and wherein said data transfer means comprises broadcast end monitoring means for determining whether all of the destination clusters post reception of the broadcast data.

10. A multi-cluster computer system according to claim 6, said inter-cluster connection means comprises arbitration means for arbitrating data transfer via said inter-cluster connection means.

* * * * *